US 12,302,383 B2

(12) United States Patent
Xue et al.

(10) Patent No.: US 12,302,383 B2
(45) Date of Patent: May 13, 2025

(54) RESERVATION OF CYCLIC PREFIX (CP) EXTENSION (CPE) BASED CHANNEL ACCESS IN SIDELINK UNLICENSED

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 552 days.

(21) Appl. No.: 17/655,598

(22) Filed: Mar. 21, 2022

(65) Prior Publication Data

US 2023/0319872 A1 Oct. 5, 2023

(51) Int. Cl.
*H04L 27/26* (2006.01)
*H04W 16/14* (2009.01)
*H04W 74/00* (2009.01)
*H04W 74/08* (2024.01)
*H04W 74/0808* (2024.01)

(52) U.S. Cl.
CPC ..... *H04W 74/0808* (2013.01); *H04L 27/2607* (2013.01); *H04W 16/14* (2013.01); *H04W 74/002* (2013.01)

(58) Field of Classification Search
CPC ............. H04L 27/2605; H04L 27/2607; H04L 5/0044; H04L 5/0094; H04L 27/0006; H04L 27/2602; H04L 5/005; H04W 16/14; H04W 74/002; H04W 74/0808
See application file for complete search history.

(56) References Cited

U.S. PATENT DOCUMENTS

2018/0139082 A1* 5/2018 Chen ............... H04L 5/0007
2020/0313946 A1 10/2020 Sun et al.
2022/0201753 A1 6/2022 Zhang

FOREIGN PATENT DOCUMENTS

WO 2021098860 A1 5/2021
WO 2021217484 A1 11/2021

OTHER PUBLICATIONS

International Search Report and Written Opinion—PCT/US2023/064404—ISA/EPO—Jun. 1, 2021.

* cited by examiner

*Primary Examiner* — Melvin C Marcelo
*Assistant Examiner* — Natali Pascual Peguero
(74) *Attorney, Agent, or Firm* — Patterson + Sheridan, L.L.P.

(57) ABSTRACT

Certain aspects of the present disclosure provide a method for wireless communications by a transmitter user equipment (UE). The method may include transmitting, to a receiver UE, sidelink control information (SCI) to reserve a future sidelink resource for a sidelink transmission to the receiver UE, wherein the SCI indicates transmission of the sidelink transmission will begin with a cyclic prefix (CP) extension (CPE). The method may further include transmitting, to the receiver UE, the sidelink transmission with the CPE on the future sidelink resource in accordance with the SCI.

30 Claims, 20 Drawing Sheets

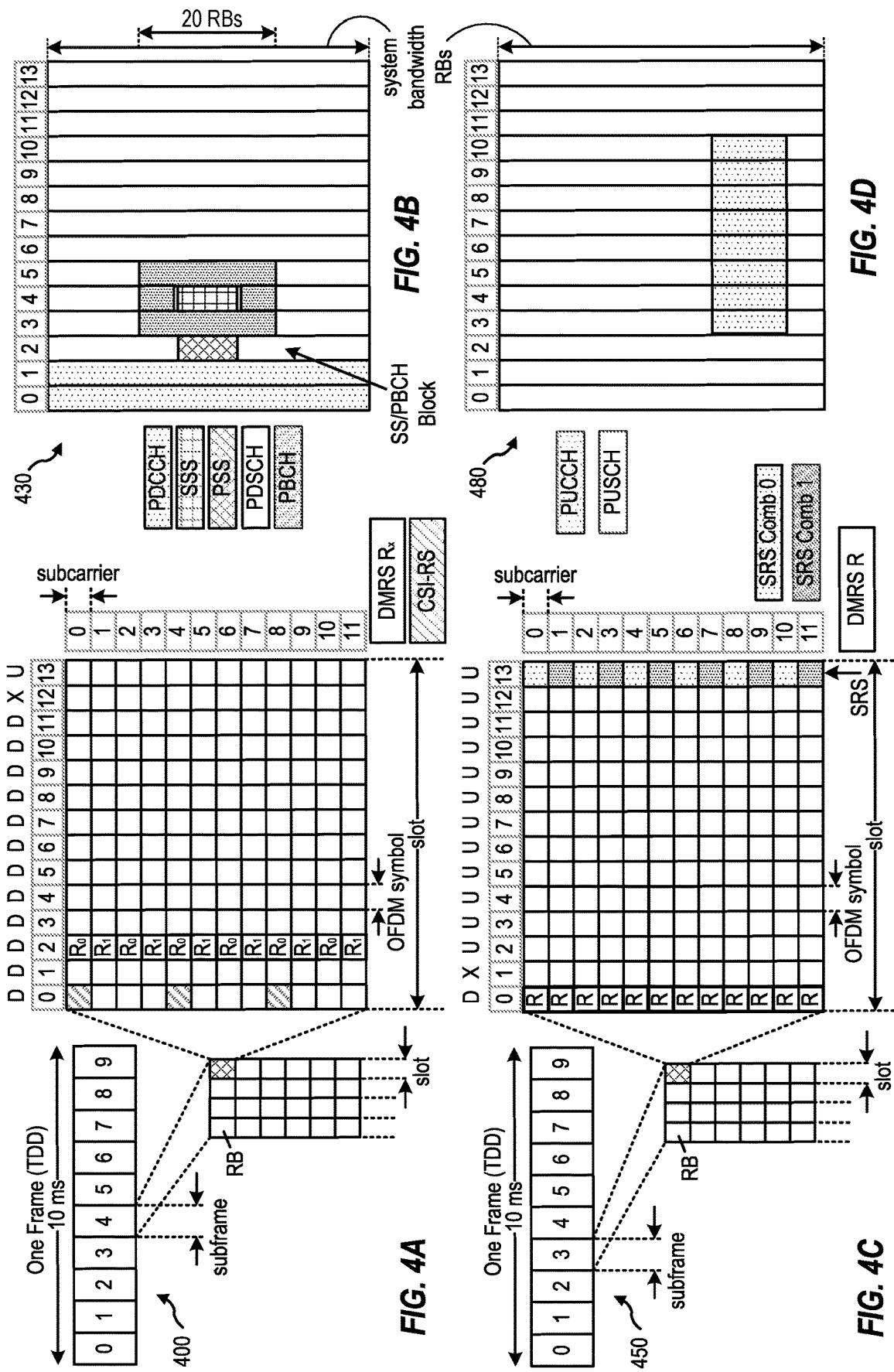

RESERVATION OF CYCLIC PREFIX (CP) EXTENSION (CPE) BASED CHANNEL ACCESS IN SIDELINK UNLICENSED

BACKGROUND

Field of the Disclosure

Aspects of the present disclosure relate to wireless communications, and more particularly, to techniques for sidelink transmissions with a cyclic prefix (CP) extension (CPE).

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a transmitter user equipment (UE), comprising: transmitting, to a receiver UE, sidelink control information (SCI) to reserve a future sidelink resource for a sidelink transmission to the receiver UE, wherein the SCI indicates transmission of the sidelink transmission will begin with a cyclic prefix (CP) extension (CPE); and transmitting, to the receiver UE, the sidelink transmission with the CPE on the future sidelink resource in accordance with the SCI.

Another aspect provides a method for wireless communications by a receiver user equipment (UE), comprising: receiving, from a transmitter UE, sidelink control information (SCI) reserving a future sidelink resource for a sidelink transmission by the transmitter UE, wherein the SCI indicates transmission of the sidelink transmission will begin with a cyclic prefix (CP) extension (CPE); and receiving, from the transmitter UE, the sidelink transmission with the CPE on the future sidelink resource in accordance with the SCI.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Aspects of the present disclosure provide apparatuses, methods, processing systems, and computer-readable mediums for sidelink transmissions with a cyclic prefix (CP) extension (CPE) to avoid collision.

New radio (NR) sidelink has been used for vehicle-to-everything (V2X) communications over licensed bands. Recently, 3rd generation partnership project (3GPP) has supported the sidelink for other applications (other than the V2X). So far, efforts to use the sidelink for the other applications have been limited to the licensed bands, yet not every other application can access the licensed bands. Techniques described herein provide utilization of sidelink unlicensed (SL-U) over an unlicensed band (e.g., with a listen before talk (LBT) procedure) and determine how to facilitate a resource reservation with respect to a CPE based channel access to avoid collision.

For example, a sidelink UE (e.g., when reserving a subchannel while operating over an unlicensed band) may include a new codepoint in a sidelink control information (SCI) indicating that a sidelink transmission will start with a CPE (e.g., ahead of a slot boundary) and a gap (e.g., for enhanced channel clearance assessment (eCCA)/listen before talk (LBT)) before the CPE. Upon receiving the SCI, a sensing/reevaluation UE (e.g., having transport blocks (TBs) of a lower priority) accepts the reservation in the SCI by only occupying a same resource block (RB) set with a shorter (or none) CPE ahead of the slot boundary and puncturing a physical sidelink shared channel (PSSCH) in a previous slot to keep silence in the gap for the LBT.

The techniques described herein to facilitate the reservation with respect to the CPE based channel access may result in a higher data rate and improved spectral efficiency (e.g., especially for enhanced mobile broadband (eMBB) type burst traffic).

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
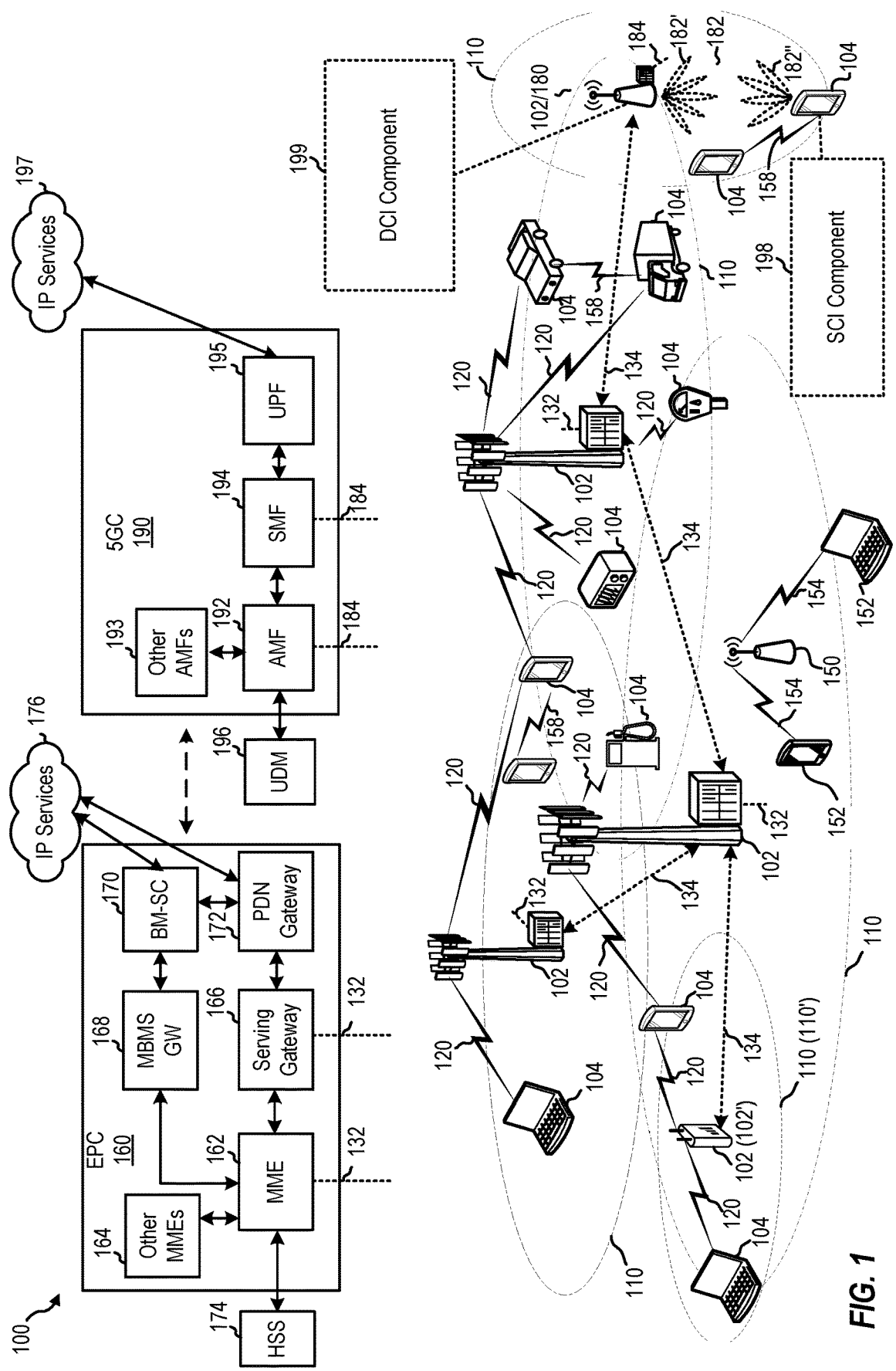
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
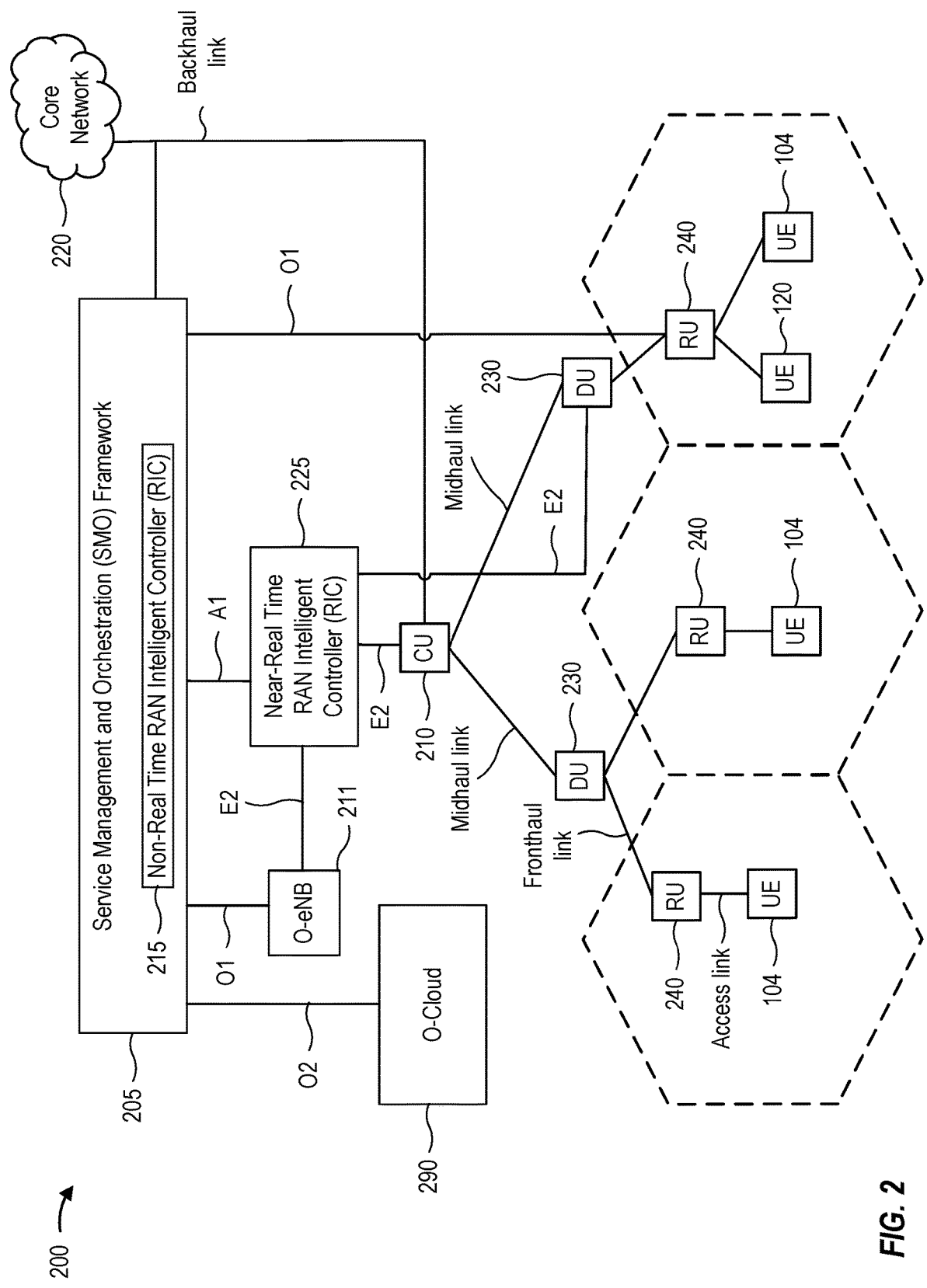
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A BS configured to communicate using mm Wave/near mm Wave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 17:
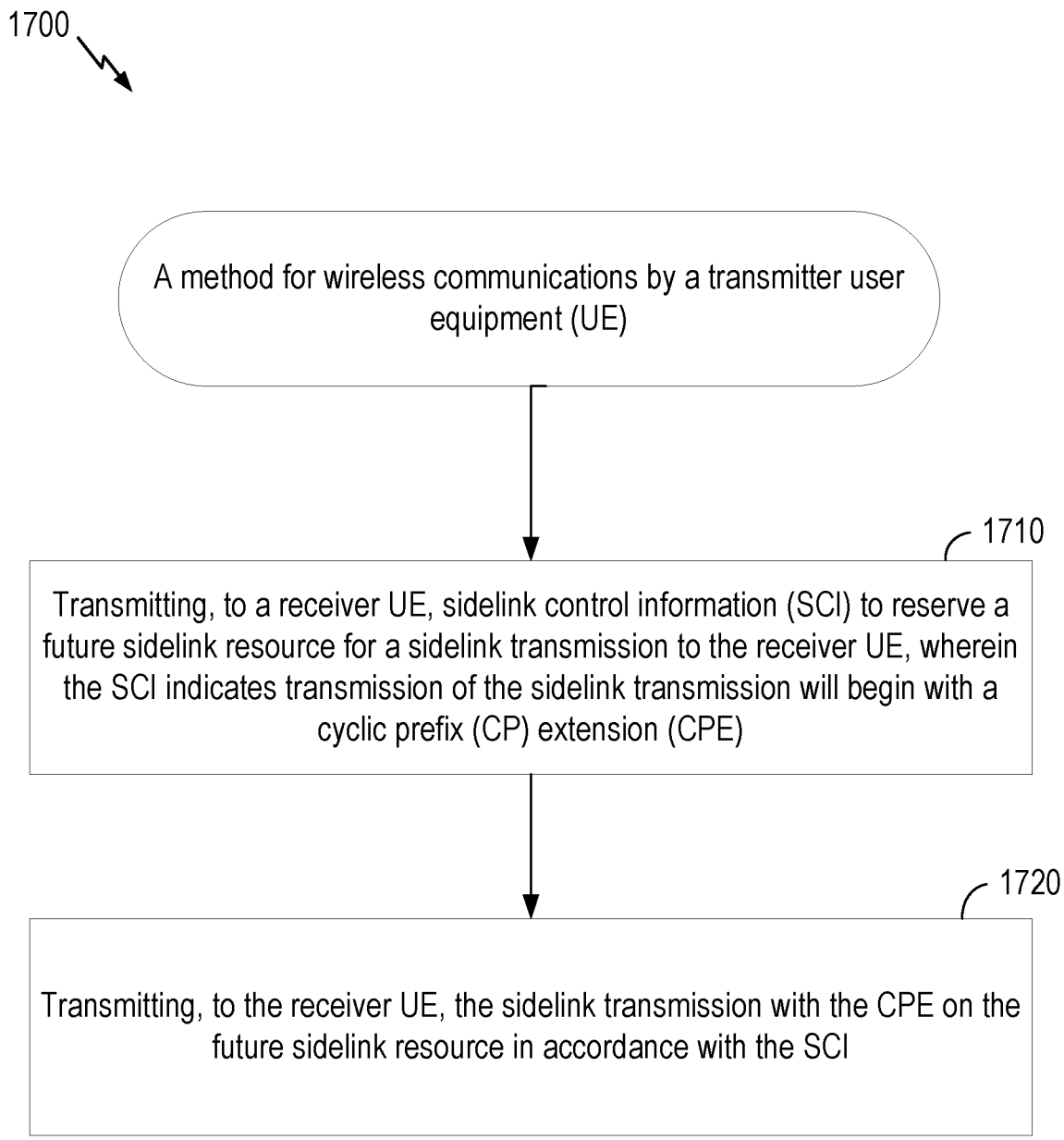
FIG. 17 depicts a method for wireless communications by a transmitter UE.
Figure 18:
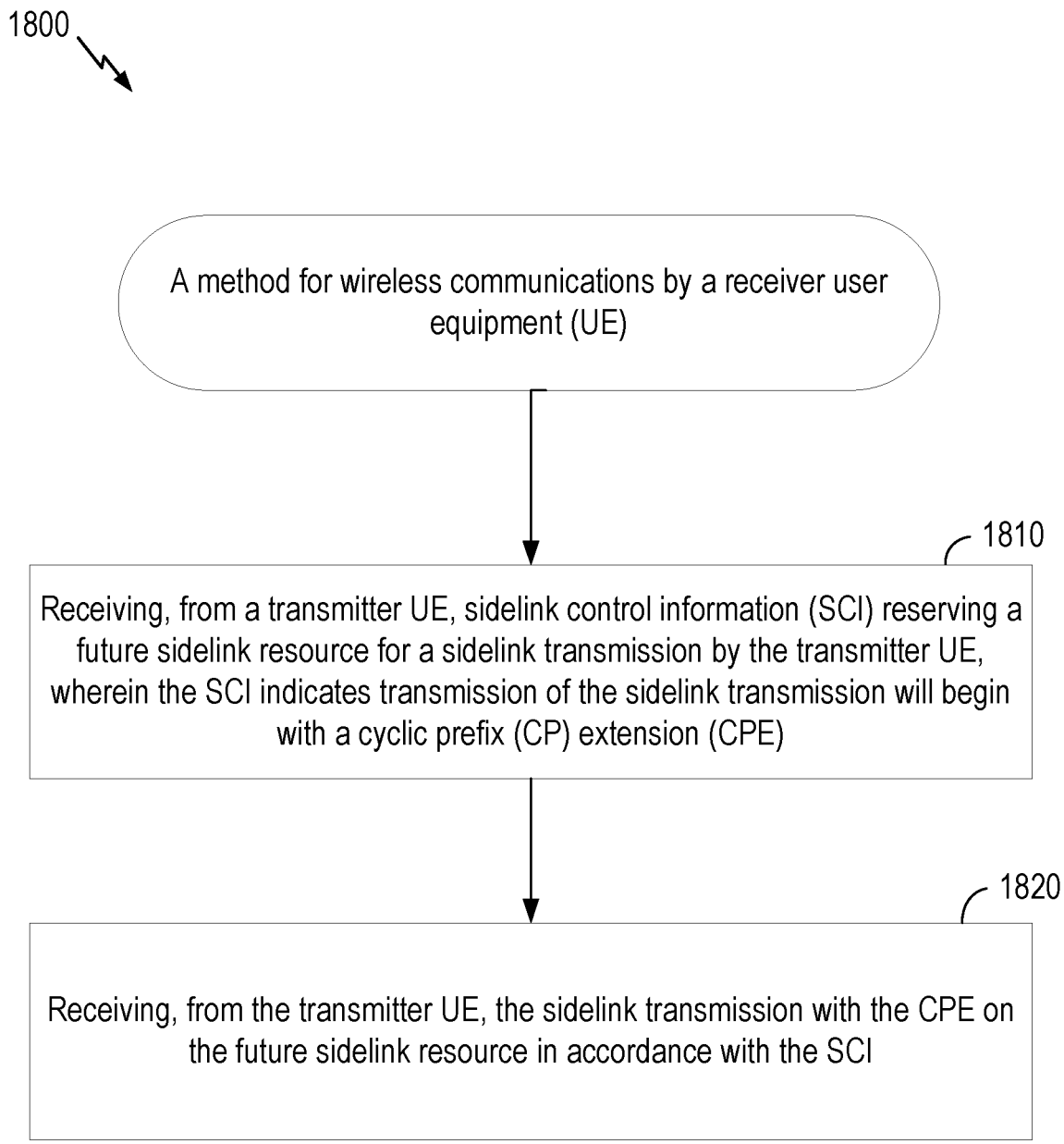
FIG. 18 depicts a method for wireless communications by a receiver UE.

Wireless communication network 100 further includes sidelink control information (SCI) component 198, which may be configured to perform operations 1700 of FIG. 17 and/or operations 1800 of FIG. 18. Wireless communication network 100 further includes downlink control information (DCI) component 199.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
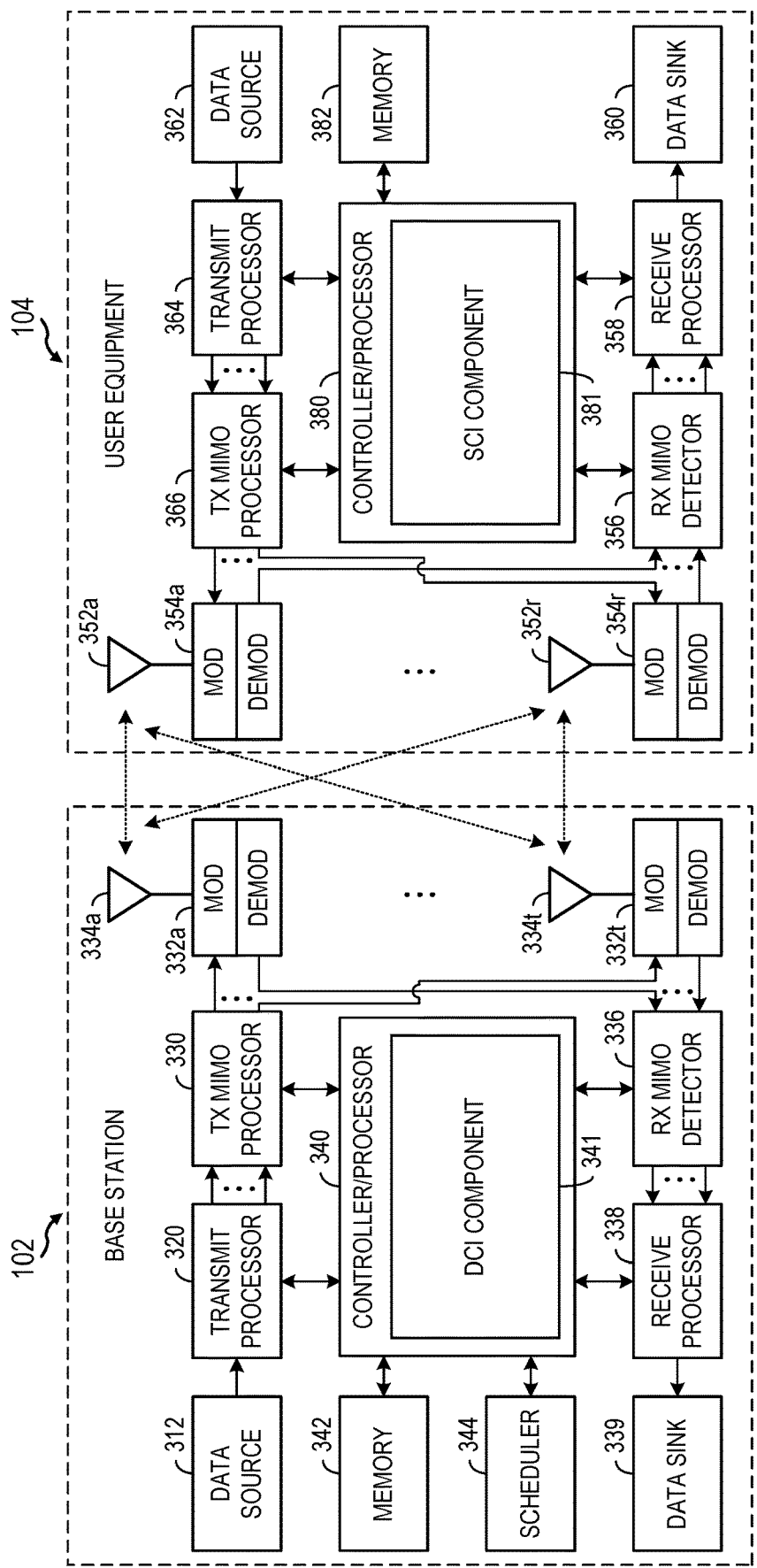
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes DCI component 341, which may be representative of DCI component 199 of FIG. 1. Notably, while depicted as an aspect of controller/processor 340, DCI component 241 may be implemented additionally or alternatively in various other aspects of BS 102 in other implementations.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes SCI component 381, which may be representative of SCI component 198 of FIG. 1. Notably, while depicted as an aspect of controller/processor 380, SCI component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Sidelink Communication

User equipments (UEs) communicate with each other using sidelink signals. Real-world applications of sidelink communications may include UE-to-network relaying, vehicle-to-vehicle (V2V) communications, vehicle-to-everything (V2X) communications, Internet of Everything (IoE) communications, IoT communications, mission-critical mesh, and/or various other suitable applications.

A sidelink signal refers to a signal communicated from one UE to another UE without relaying that communication through a scheduling entity (e.g., UE or a network entity), even though the scheduling entity may be utilized for scheduling and/or control purposes. In some examples, the sidelink signal is communicated using a licensed spectrum (e.g., unlike wireless local area networks, which typically use an unlicensed spectrum). One example of sidelink communication is PC5, for example, as used in V2V, long term evolution (LTE), and/or new radio (NR).

Various sidelink channels are used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH carries discovery expressions that enable proximal UEs to discover each other. The PSCCH carries control signaling such as sidelink resource configurations, resource reservations, and other parameters used for data transmissions. The PSSCH carries data transmissions. The PSFCH carries a feedback such as acknowledgement (ACK) and/or negative ACK (NACK) information corresponding to transmissions on the PSSCH.

In some NR systems, a two stage sidelink control information (SCI) is supported. The two stage SCI includes a first stage SCI (e.g., SCI-1) and a second stage SCI (e.g., SCI-2). The SCI-1 includes resource reservation and allocation information. The SCI-2 includes information that can be used to decode data and to determine whether a UE is an intended recipient of a transmission. The SCI-1 and/or the SCI-2 may be transmitted over a PSCCH.

Figure 5B:
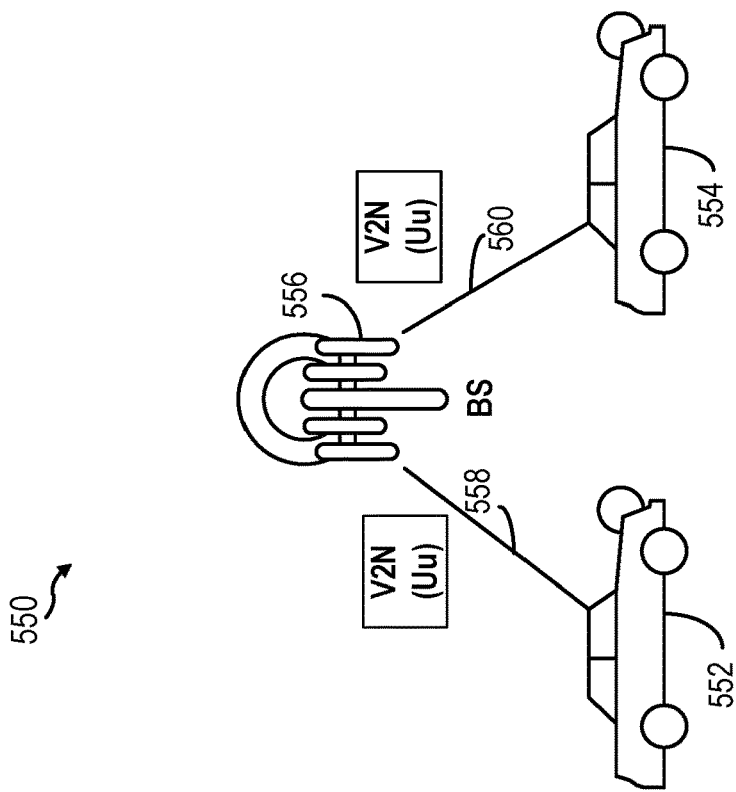
FIGS. 5A-5B depict diagrammatic representations of example vehicle-to-everything (V2X) systems.
Figure 5A:
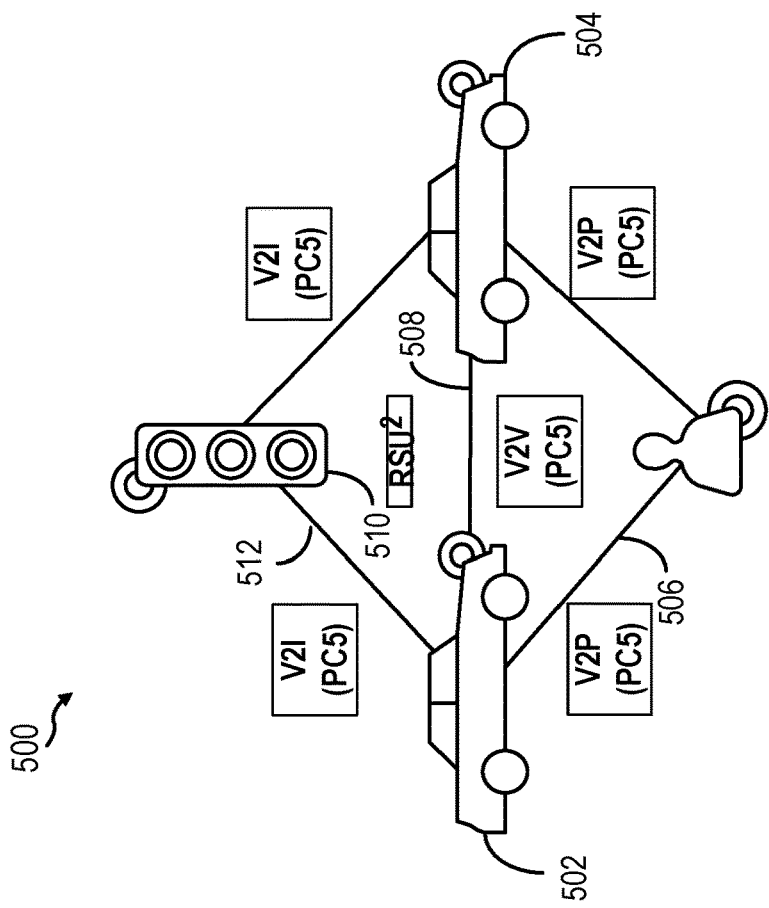

FIG. 5A and FIG. 5B show diagrammatic representations of example V2X systems. For example, vehicles shown in FIG. 5A and FIG. 5B communicate via sidelink channels and relay sidelink transmissions. V2X is a vehicular technology system that enables vehicles to communicate with traffic and an environment around them using short-range wireless signals, known as sidelink signals.

The V2X systems shown in FIG. 5A and FIG. 5B provide two complementary transmission modes. A first transmission mode, shown by way of example in FIG. 5A, involves direct communications (e.g., also referred to as sidelink communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (e.g., including V2V communications) is illustrated with two vehicles 502, 504. A first transmission mode allows for direct communication between different participants in a given geographic location. As illustrated, a vehicle 502 can have a wireless communication link 506 with an individual through a PC5 interface. Communications between the vehicles 502 and 504 may also occur through a PC5 interface 508. In a like manner, communication may occur from the vehicle 502 to other highway components (e.g., a roadside unit (RSU) 510), such as a traffic signal or sign through a PC5 interface 512. With respect to each communication link illustrated in FIG. 5A, two-way communication may take place between devices, therefore each device may be a transmitter and a receiver of information. The V2X system 500 is a self-managed system implemented without assistance from a network entity. A self-managed system may enable improved spectral efficiency, reduced cost, and increased reliability as network service interruptions do not occur during handover operations for moving vehicles. The V2X system 500 is configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. Network communications may occur through discrete nodes, such as a network entity 556 that sends and receives information to and from (e.g., relays information between) the vehicles 552, 554. The network communications through vehicle to network (V2N) links 558 and 560 may be used, for example, for long-range communications between the vehicles 552, 554, such as for communicating the presence of a car accident a distance ahead along a road or highway. Other types of communications may be sent by a wireless node to the vehicles 552, 554, such as traffic flow conditions, road hazard warnings, environmental/weather reports, and service station availability, among other examples. Such data can be obtained from cloud-based sharing services.

Example Vehicle-to-Everything (V2X) Focused New Radio (NR) Sidelink and Sidelink Unlicensed A new radio (NR) sidelink system is used for vehicle-to-everything (V2X) communications to exchange short and sparse messages among vehicular user equipments (UEs) (e.g., over sub-7 GHz intelligent transport systems (ITS)/licensed bands).

In the NR sidelink system, two channel access/resource allocation modes (e.g., Mode 1 and Mode 2) are specified. The Mode 1 is specified for in-coverage deployment where a sidelink UE receives a grant from a gNodeB (gNB) for a centralized channel access. The Mode 2 is specified for autonomous deployment where a sidelink UE performs sensing-and-reservation based distributed channel access.

In some cases, sidelink resources in the NR sidelink system are arranged to support orthogonal frequency division multiple access (OFDMA) (e.g., using "subchannel x slot" as granularity). In some cases, a subchannel can be pre-configured (e.g., to be of 10 resource block (RB), 12RB, 15RB, 20RB, 25RB, 50RB, 75RB, or 100RB). Also, for a given resource pool, a relatively small subchannel size may help in suppressing collision when traffics are dominated by small transport blocks (TBs), and a rare and large TB can be carried by simultaneously transmitting over adjacent subchannels.

Figure 6:
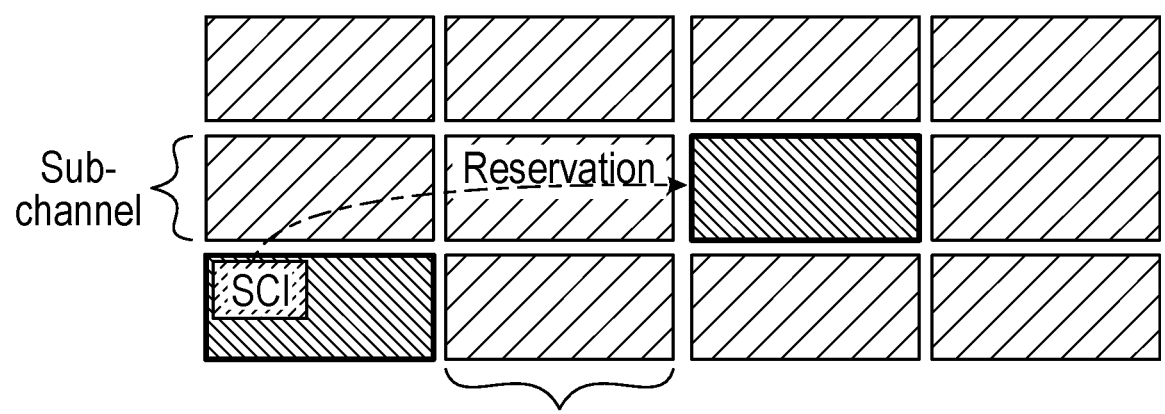
FIG. 6 depicts example subchannels and slots.

In some cases, as illustrated in FIG. 6, a sidelink UE carries a codepoint in a sidelink control information (SCI) to reserve a future sidelink resource for a retransmission (e.g., a dynamic reservation) or a new transmission (e.g., a periodical reservation). A sensing UE (e.g., when operating in the Mode 2) may decode the received SCI in its sensing window and perform collision avoidance accordingly.

In some cases, a discontinuous reception (DRX) in the NR is specified for battery-powered UEs, and inter-UE coordination is specified for a higher reliability in the Mode 2. In addition, sidelink applications have been limited to sub-7 GHz licensed/ITS bands, and not every sidelink application can access to sub-7 GHz licensed/ITS bands.

In some cases, a sidelink may be deployed over other bands. For example, the the sidelink may be deployed on a frequency range 1 (FR1) unlicensed spectrum for both the Mode 1 and the Mode 2 where Uu operation for the Mode 1 is limited to a licensed spectrum (e.g., with possible scope of evaluation methodology for a sidelink operation on the unlicensed spectrum, a sidelink channel access mechanism for the unlicensed spectrum, and/or required changes to channel structures and procedures to operate on the unlicensed spectrum).

The present disclosure considers utilization of sidelink unlicensed (SL-U) over a FR1 unlicensed band with a listen before talk (LBT) procedure, and determines how to facilitate resource reservation with respect to a cyclic prefix (CP) extension (CPE) based channel access to improve spectral efficiency (e.g., especially for carrying enhanced mobile broadband (eMBB) type burst traffic).

Figure 7:
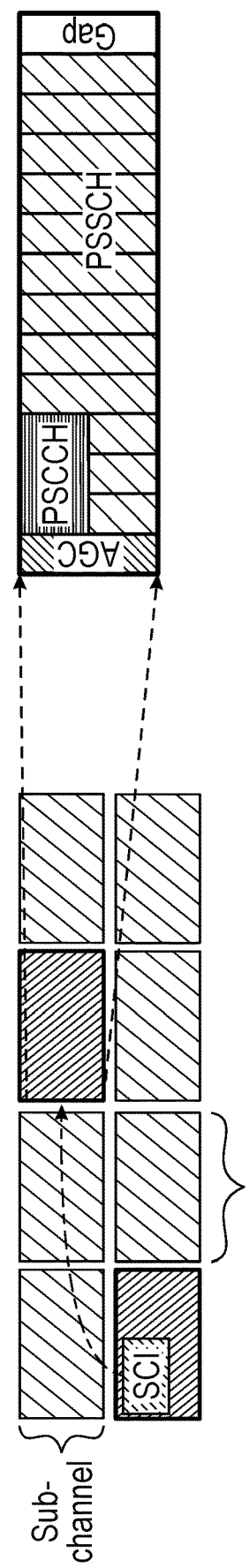
FIG. 7 depicts example reservation of resource for a sidelink transmission via a sidelink control information (SCI).

In some cases, a LBT procedure is facilitated for coexistence with other radio access technologies (RATs) to specify a NR unlicensed (NR-U). For example, reusing mechanisms are developed for intra-RAT resource allocations and performing the LBT procedure (e.g., when accessing allocated resources for inter-RAT co-existence). This leads to simultaneous transmission at a slot boundary (i.e., an automatic gain control (AGC) symbol per legacy) and simultaneously keeping silence in a last "gap" symbol (e.g., as illustrated in FIG. 7) for a channel clearance assessment (CCA). Such reusing mechanisms can be used for V2X communications.

In some cases, when a size of a subchannel is large enough for a considered TB (e.g., for carrying relatively small packets in the V2X communications), frequency division multiplexed (FDMed) subchannels can effectively reduce a probability of collisions of simultaneous channel access attempts (e.g., when system loading is moderate). Furthermore, a periodicity of the V2X communications traffic can be leveraged by a reservation mechanism to further suppress collision. However, typical eMBB traffic is neither of a small TB size nor with the periodicity.

Figure 8:
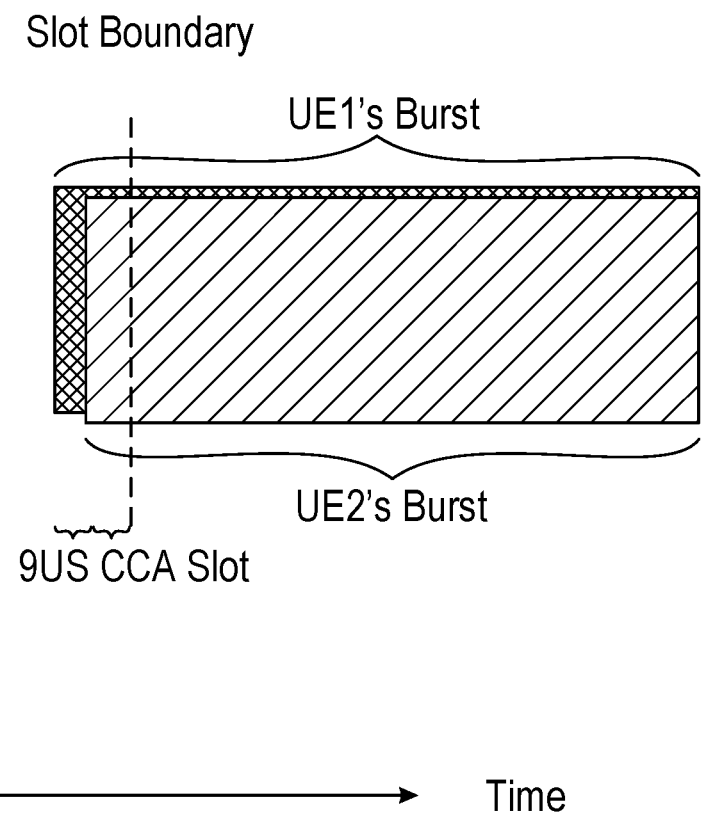
FIG. 8 depicts example UE1 burst and UE2 burst.

Example Cyclic Prefix (CP) Extension (CPE) for Opportunistic Time Division Multiplexing (TDM) and Resource Overbooking As illustrated in FIG. 8, user equipment 1 (UE1) and UE2 are configured and granted to transmit over a same uplink resource (e.g., using full interlaces within a resource block (RB) set). To avoid collision, UE1 is granted to transmit 9 us (e.g., a channel clearance assessment (CCA) slot for 20 MHz listen before talk (LBT) in 5 GHZ/6 GHz unlicensed band) ahead of UE2. When UE1 is transmitting, the LBT at UE2 will block its transmission to avoid collision. Otherwise, UE2 is able to transmit to avoid waste of a granted UE radio resource. Accordingly, a cyclic prefix (CP) extension (CPE) facilitates an opportunistic time division multiplexing (TDM) via the LBT, and at a same time mitigates the LBT uncertainty via a resource overbooking.

Example Channel Occupancy Time (COT) Based Transmission and Reservation

A listen before talk (LBT) based channel access in an unlicensed band (e.g., 5 GHZ/6 GHz unlicensed band) may be regulated with a channel occupancy time (COT) based transmission for efficiency. For example, a node can perform a LBT (e.g., a Type 1 LBT) lasting up to more than 9 ms, to obtain the COT for a continuous transmission (e.g., up to 10 ms) before leaving a gap (e.g., being larger than 16 us).

In some cases, radio access technologies (RATs) such as Wi-Fi and new radio (NR) unlicensed are capable for performing COT based transmission. Consequently, sidelink unlicensed has to be specified with a similar capability for a co-existence therein (e.g., this is against of always keeping silence in a "gap" symbol for the LBT).

Figure 9A:
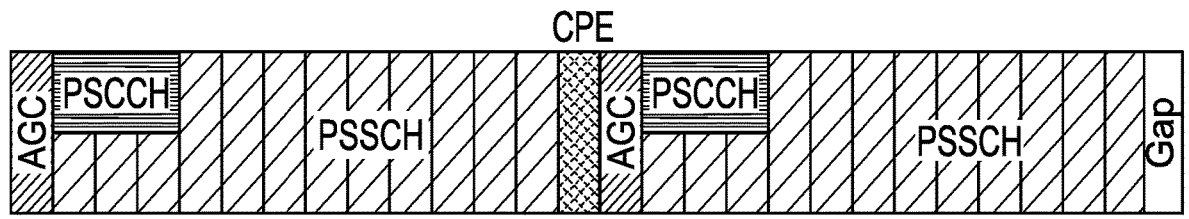
FIG. 9A depicts example cyclic prefix (CP) extension (CPE) from an automatic gain control (AGC) symbol of a following slot to perform inter-slot continuous transmission within a channel occupancy time (COT).
Figure 9B:
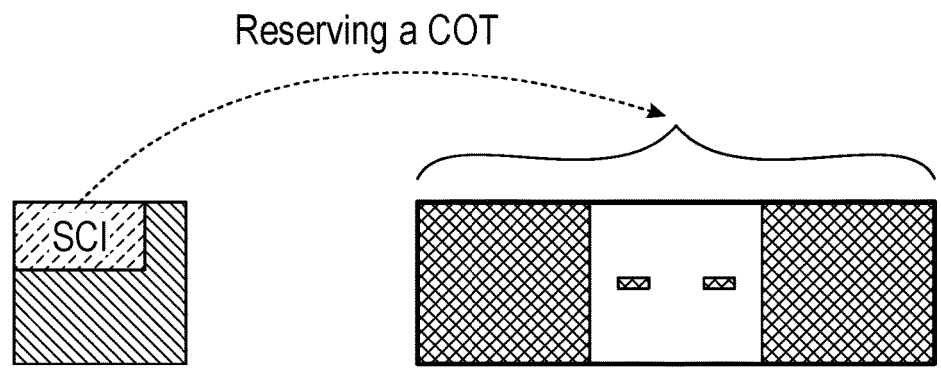
FIG. 9B depicts example reservation of a COT via a new codepoint in a SCI.
Figure 9C:
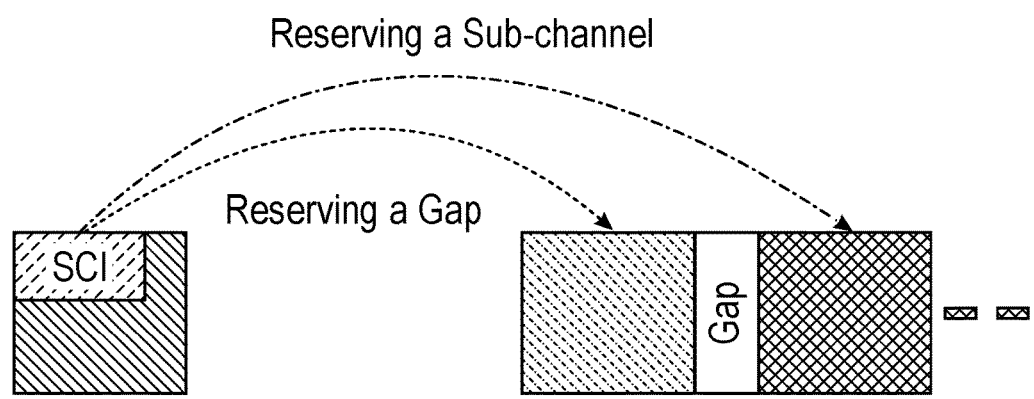
FIG. 9C depicts example reservation of a gap for a listen-before-talk (LBT) procedure before a subchannel.

There are multiple techniques to enable COT based transmissions and reservation in the sidelink unlicensed. One example technique proposes to transmit a CPE (e.g., as illustrated in FIG. 9A) from an automatic gain control (AGC) symbol of a following slot to perform inter-slot continuous transmission within a COT. Another example technique, as illustrated in FIG. 9B, proposes to directly reserve (e.g., via a new codepoint in a sidelink control information (SCI)) a COT and then perform continuous transmission therein. Another example technique, as illustrated in FIG. 9C, proposes to additionally reserve a gap (e.g., for a LBT) before a subchannel, which may lead continuous transmissions starting from there.

Aspects Related to Reservation of Cyclic Prefix (CP) Extension (CPE) Based Channel Access in Sidelink Unlicensed Aspects of the present disclosure provide apparatuses, methods, processing systems, and computer-readable mediums for sidelink transmissions with a cyclic prefix (CP) extension (CPE).

For example, a sidelink UE (e.g., when reserving a subchannel while operating over an unlicensed band) may include a new codepoint in a sidelink control information (SCI) indicating that a sidelink transmission will start with a CPE (e.g., ahead of a slot boundary) and a gap (e.g., for enhanced channel clearance assessment (eCCA)/listen before talk (LBT)) before the CPE. Upon receiving the SCI, a sensing/reevaluation UE (e.g., having transport blocks (TBs) of a lower priority) accepts the reservation in the SCI by only occupying a same resource block (RB) set with a shorter (or none) CPE ahead of the slot boundary and puncturing a physical sidelink shared channel (PSSCH) in a previous slot to keep silence in the gap for the LBT.

The techniques described herein to facilitate the reservation with respect to the CPE based channel access may result in a higher data rate and improved spectral efficiency (e.g., especially for enhanced mobile broadband (eMBB) type burst traffic).

The techniques for the reservation of the CPE based channel access in sidelink unlicensed proposed herein may be understood with reference to the FIGS. 10-18.

Figure 10:
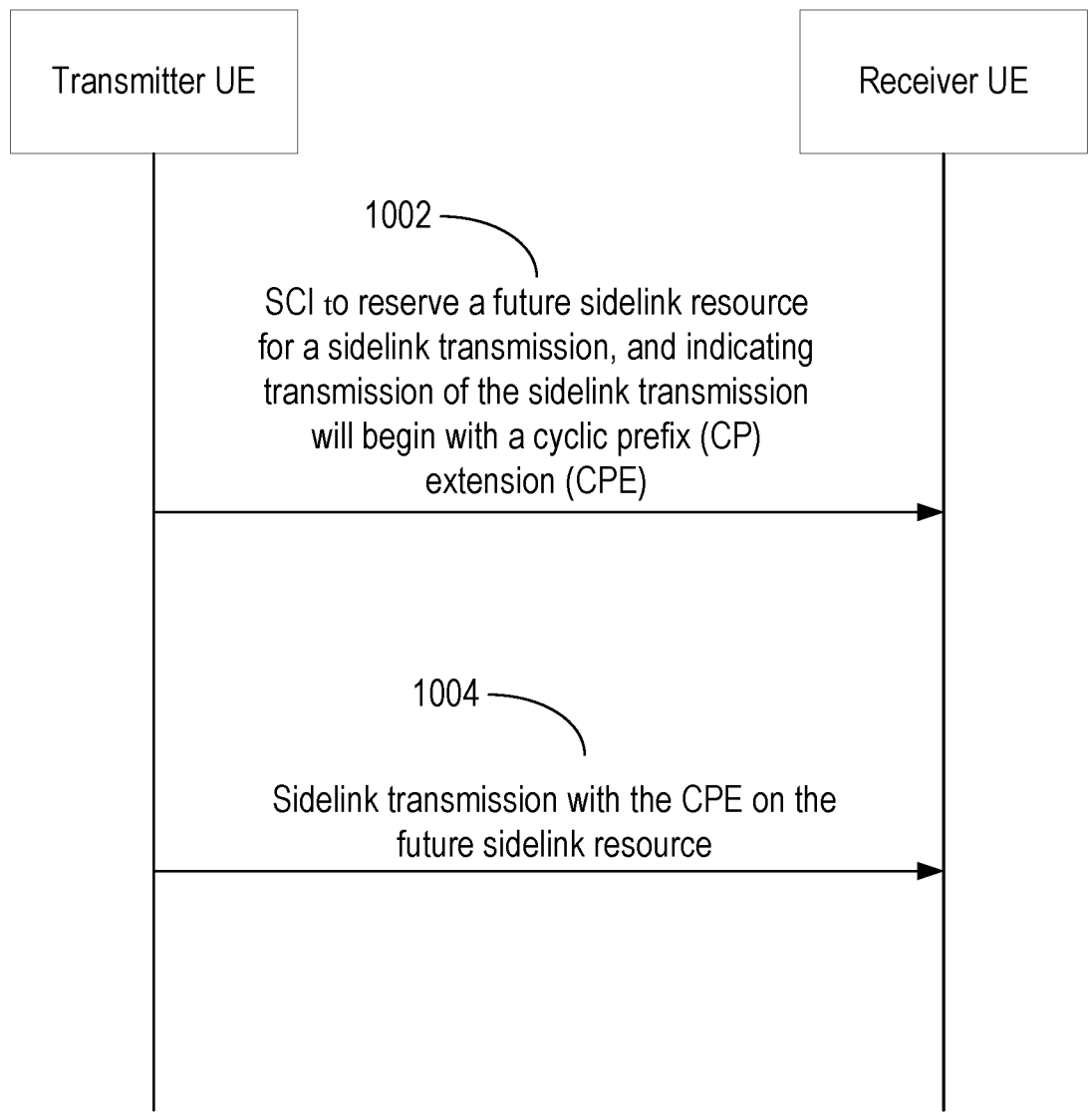
FIG. 10 depicts a call flow diagram illustrating example communication between a transmitter UE and a receiver UE.

As illustrated in FIG. 10, at 1002, a transmitter UE (e.g., a UE that transmits information to another UE that receives the information) transmits a sidelink control information (SCI) to reserve a future sidelink resource for a sidelink transmission to a receiver UE (e.g., a sensing UE that receives information transmitted by another UE). The SCI indicates transmission of the sidelink transmission will begin with a CPE. The future sidelink resource includes frequency resources within an unlicensed spectrum.

At 1004, the transmitter UE transmits to the receiver UE the sidelink transmission with the CPE on the future sidelink resource (e.g., in accordance with the SCI).

Figure 11:
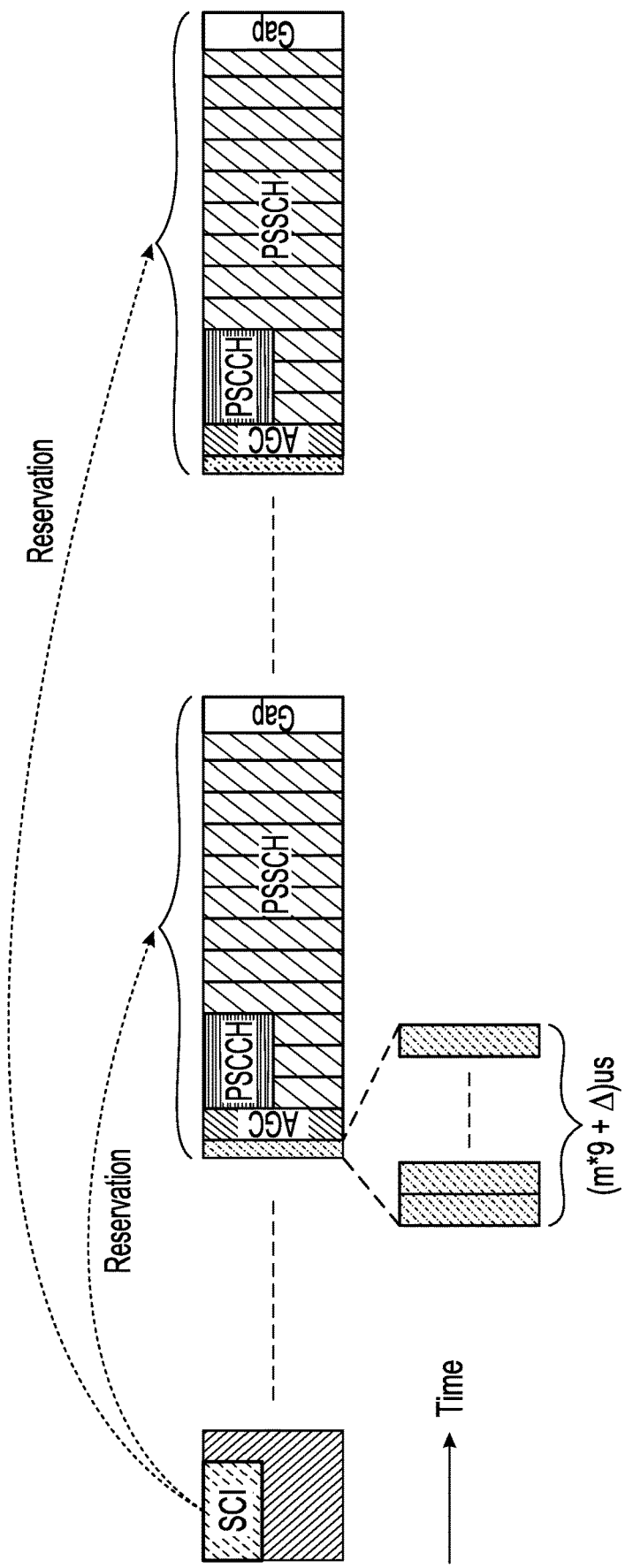
FIG. 11 depicts example reservation of a subchannel together with a time-frequency resource for a CPE by a transmitter UE.

In certain aspects, the transmitter UE generates the CPE from a first orthogonal frequency-division multiplexing (OFDM) symbol of the sidelink transmission. For example, the transmitter UE (e.g., when operating over an unlicensed band imposed with a listen before talk (LBT)) may reserve a subchannel together with a time-frequency resource for the CPE, which is to be generated from the first OFDM symbol of said subchannel. In one example, as illustrated in FIG. 11, multiple such kind of reservations can be carried in a same SCI.

In certain aspects, the transmitter UE determines a duration of the CPE (e.g., based on a subcarrier spacing (SCS) and/or a timing advance (TA) value for the transmitter UE). For example, as further illustrated in FIG. 11, the CPE can be (m*9+Δ) us, where 9 us is a clear channel assessment (CCA) slot with 20 MHz LBT, 0≤ Δ (e.g., TA value)<9, and integer m≥0.

Figure 12:
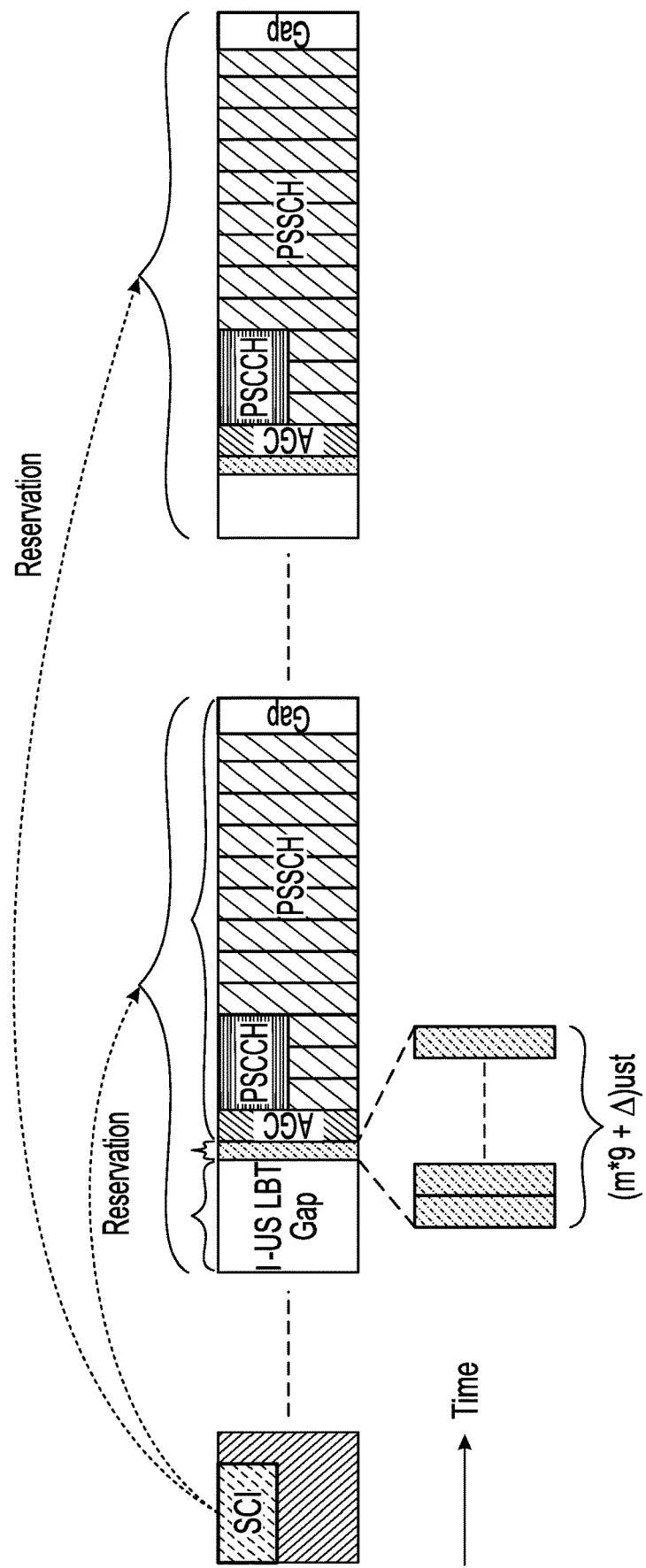
FIG. 12 depicts example reservation of a subchannel together with a time-frequency resource for a CPE and a gap for a LBT procedure before a CPE by a transmitter UE.

In certain aspects, the SCI further indicates a gap (as illustrated in FIG. 12) for a LBT procedure/enhanced CCA (eCCA) before the CPE. The transmitter UE performs the LBT procedure and transmits the sidelink transmission after the LBT procedure is performed. For example, the transmitter UE may occupy a channel with the indicated CPE (e.g., via the SCI) after passing the LBT procedure, and then continuously transmits in a channel occupancy time (COT).

In certain aspects, the transmitter UE autonomously selects the CPE (i.e., values of m and Δ) according to L3 configurations (e.g., range and rules). In one example, the transmitter UE randomly selects a duration of the CPE (i.e., m and Δ) within an allowed range. In another example, the transmitter UE selects a duration of the CPE based on a mapping of one or more variables to the CPE. The one or more variables may include a priority value, a packet delay budget (PDB) value, and/or a channel busy ratio (CBR).

In certain aspects, the SCI explicitly indicates at least one value of the CPE (i.e., the CPE is explicitly indicated).

In certain aspects, the SCI carries a channel access priority class (CAPC) mapped to different values for the CPE, and the transmitter UE randomly selects one value within the different values for the CPE (e.g., the CPE is implicitly indicated via the CAPC, which is also carried in a stage-one SCI (SCI-1).

In certain aspects, the transmitter UE may be provided (e.g., in broadcasting L3) the mapping from the CAPC to the CPE. Specifically, each CAPC can be mapped to a range of CPEs (e.g., one-to-many mapping), and the transmitter UE is configured to randomly select one value within the range. In this case, the receiver UE determines the range of the CPEs via the CAPC, and yet does not know the exact CPE.

In certain aspects, a resource pool provides a static configuration on whether to apply the implicit CPE indication. If enabled, the receiver UE determines the CPE (or its range) from the CAPC carried in the SCI-1.

In certain aspects, a resource pool allows each UE (e.g., the transmitter UE and/or the receiver UE) to carry one bit to indicate whether it may apply the implicit CPE in a reservation instance(s).

Figure 13:
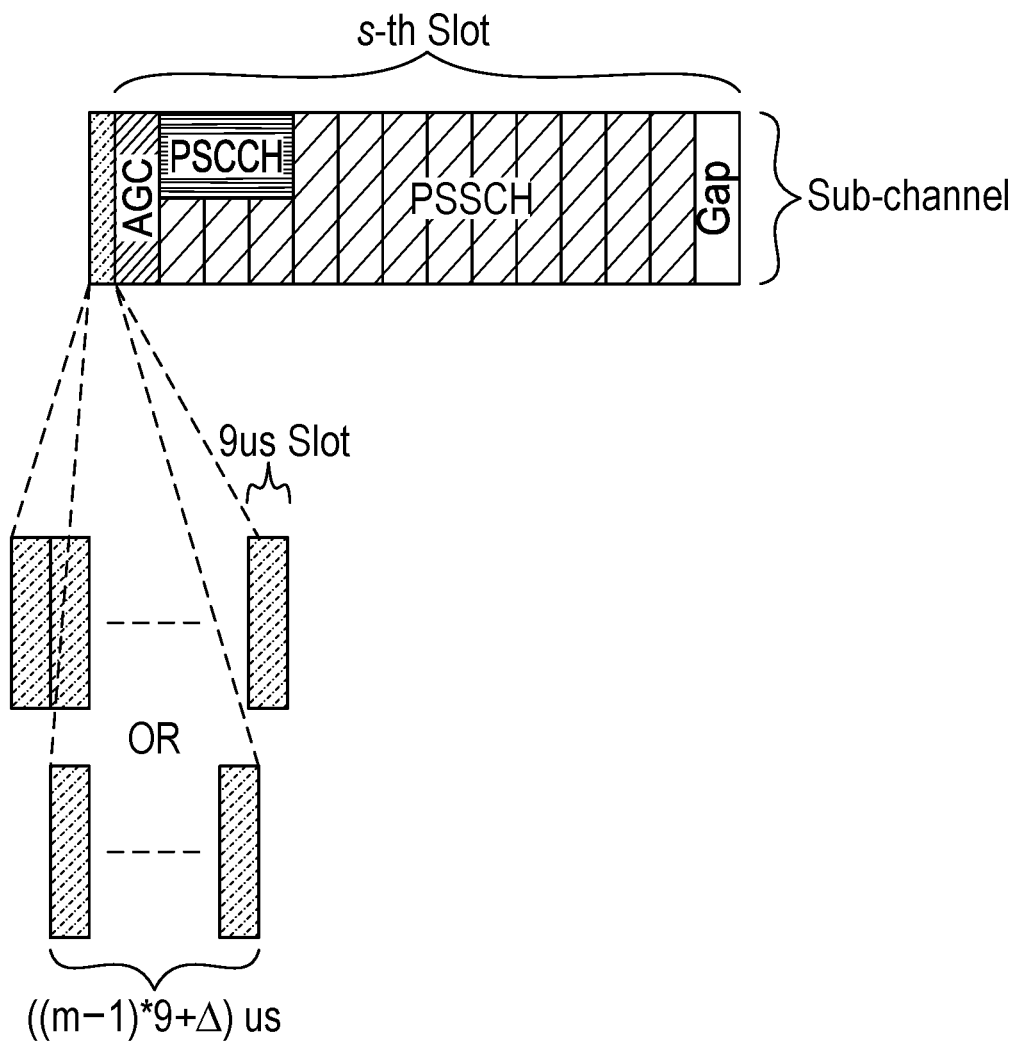
FIG. 13 depicts example reservation indicating multiple starting points defined via different CPEs.

In certain aspects, the SCI further indicates different values of the CPE and multiple starting points for the sidelink transmission based on the different values of the CPE (e.g., the transmitter UE may send a reservation indicating the multiple starting points defined via different CPEs). For example, as illustrated in FIG. 13, a reservation (e.g., via the SCI) includes two starting points for a physical sidelink shared channel (PSSCH) in s-th slot: one starting point with a (m*9+Δ) us CPE, and another starting point with a ((m−1)*9+Δ) us CPE. The transmitter UE may attempt the LBT procedure before a longest CPE, and transmit if the LBT procedure passes. Otherwise, the transmitter UE may continue the LBT attempt to see a chance of transmission at a second CPE.

In certain aspects, the SCI further indicates multiple starting points for the sidelink transmission based on the different values of the CPE within an allowed range (e.g., instead of randomly selecting one value within the range of CPEs corresponding to a CAPC, the transmitter UE may overbook multiple starting points by allowed multiple CPEs).

In certain aspects, the CPE is allowed in new radio (NR) unlicensed for uplink transmission with full interlaces in a resource block (RB) set. In sidelink unlicensed, due to a concern on an inter-block interference (IBI) with an interlaced waveform, the SCI indicates that the transmission of the sidelink transmission will begin with a non-zero CPE, when the transmitter UE uses partial interlaces in a slot (e.g., the transmitter UE is allowed to send the reservation via the SCI with the non-zero CPE when it only uses partial interlaces in the s-th slot).

In certain aspects, the transmitter UE makes the reservation for the CPE based channel access and the SCI indicates that the transmission of the sidelink transmission will begin with the CPE, when the transmitter UE occupies a number of interlaces more than an interlace threshold (e.g., a large-enough number of interlaces) for transmitting one or more transport blocks (TBs).

In certain aspects, the transmitter UE makes the reservation for the CPE based channel access and the SCI indicates that the transmission of the sidelink transmission will begin with the CPE, when one or more TBs to be transmitted to the receiver UE have a priority more than a priority threshold (e.g., a high priority).

In certain aspects, the transmitter UE makes the reservation for the CPE based channel access and the SCI indicates that the transmission of the sidelink transmission will begin with the CPE, when one or more TBs to be transmitted to the receiver UE have a PDB more than a PDB threshold (e.g., a tight enough PDB).

In certain aspects, the transmitter UE makes the reservation for the CPE based channel access and the SCI indicates that the transmission of the sidelink transmission will begin with the CPE, when a value of a constant-bit-rate (CBR) is more than a CBR threshold (e.g., a high CBR).

In certain aspects, the receiver UE (e.g., upon receiving a reservation with the CPE in the SCI) behaves differently according to a priority of to-be-transmitted TB(s) and of the reservation. For example, the receiver UE transmits a TB using the future sidelink resource with a first CPE having a value greater than the CPE, when the TB has a priority more than a predetermined threshold. In other words, when the to-be-transmitted TB(s) have a higher priority, the receiver UE decides to transmit at s-th slot with a longer CPE to occupy a channel sooner than the reservation.

In certain aspects, the receiver UE transmits a TB using the future sidelink resource with the same CPE, when the TB has a priority less than a predetermined threshold and there are sidelink resources available in a same RB set. In other words, the receiver UE transmits at s-th slot with the same CPE if there are available sub-channel(s) in the same RB set.

In certain aspects, the receiver UE transmits a TB using the future sidelink resource with a second CPE having a value smaller than the CPE, when the TB has a priority less than a predetermined threshold and there are no sidelink resources available. In other words, the receiver UE transmits at s-th slot using a shorter CPE, and overbook a same sub-channel (e.g., when there is no free sub-channel therein) upon a LBT procedure outcome (i.e., the receiver UE transmits when the transmitter UE failed the LBT procedure while the receiver UE passed the LBT procedure).

In certain aspects, the receiver UE transmits a TB using the future sidelink resource with a third CPE having a value greater than the different values of the CPE when the TB has a priority more than a predetermined threshold. In certain aspects, the receiver UE transmits a TB using the future sidelink resource with a fourth CPE having a value smaller than the different values of the CPE when the TB has the priority less than the predetermined threshold. In other words, upon receiving the reservation via the SCI with the multiple starting points, the receiver UE determines to transmit with a CPE being longer than a longest CPE (e.g., for a case of higher priority). Otherwise, the receiver UE determines to transmit with the CPE being shorter than a shortest CPE.

Figure 14:
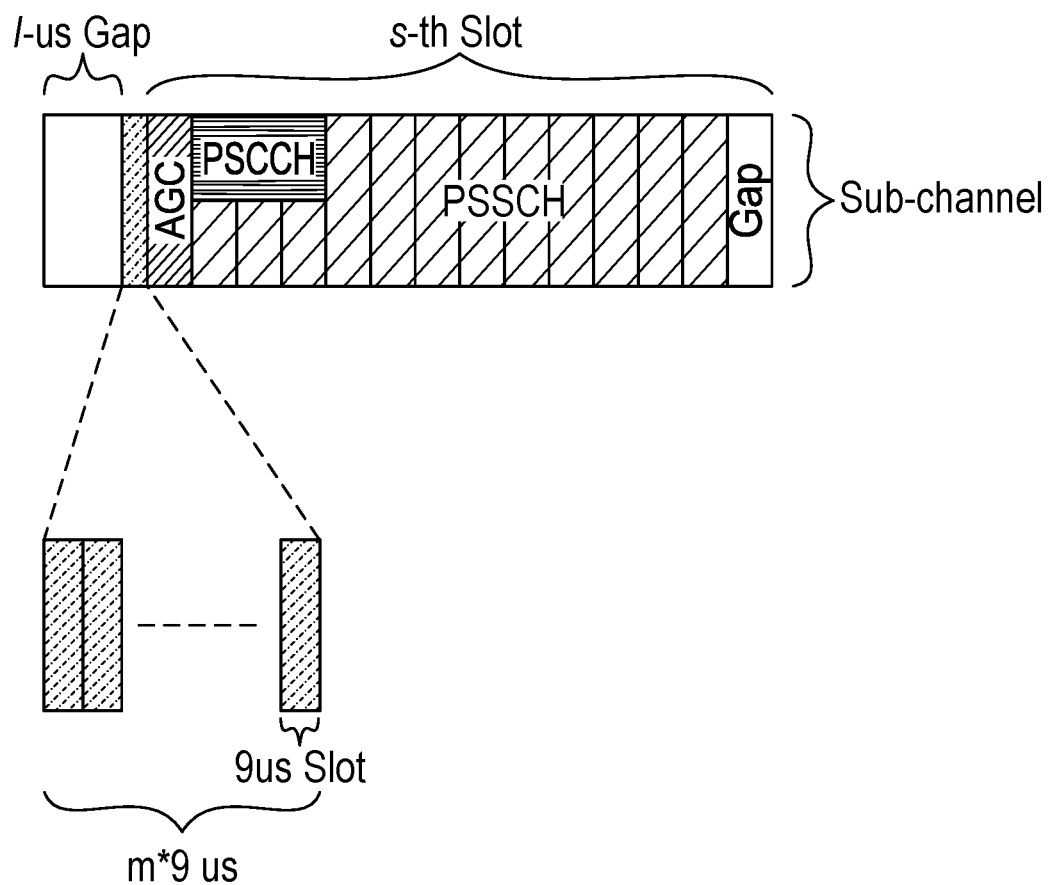
FIG. 14 depicts example reservation of a gap for a LBT procedure before a CPE.

In certain aspects, the transmitter UE reserves a gap (e.g., 1-us LBT gap as illustrated in FIG. 14) together with the reserved CPE. This includes zero-length CPE (i.e., m=Δ=0 in 1). In some cases, the transmitter UE may be provided (e.g., in L3) with rules on how to determine the value of l depending on a priority, a PDB, and/or a CBR.

In certain aspects, the SCI explicitly indicates a value of the gap. In certain aspects, the SCI carries a CAPC, and a value of the gap is implicitly indicated to the receiver UE via the CAPC. For example, the value of l is implicitly indicated via the CAPC in SCI-1. In certain aspects, a resource pool provides L3 mapping from CAPC to l. In one example, the resource pool may statically enable the implicit indication. When enabled, the receiver UE determines that the LBT gap is reserved by the corresponding CAPC in the SCI-1. In another example, the resource pool may allow the transmitter UE to dynamically provide the implicit indication of the LBT gap for a reservation instance(s).

Figure 15:
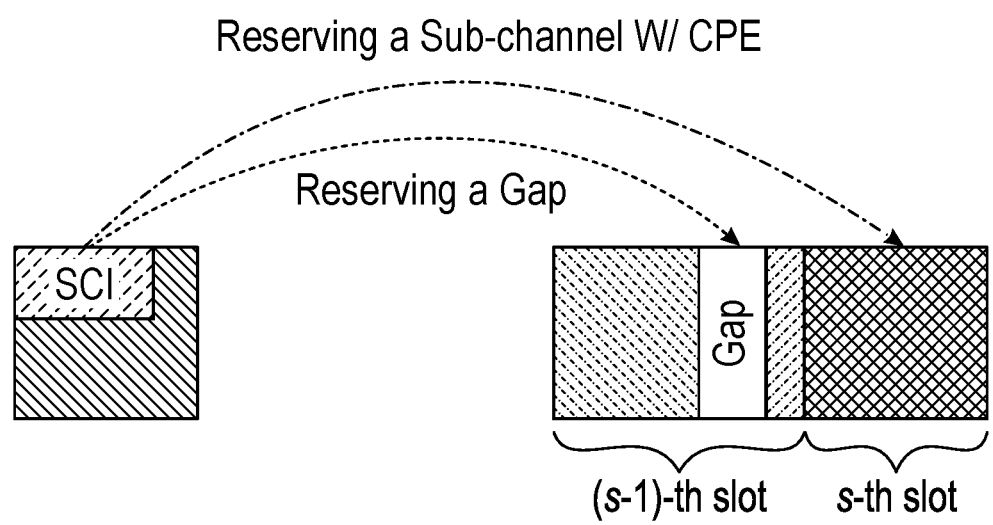
FIG. 15 depicts example LBT gap aware sensing procedure.

In certain aspects, the receiver UE performs a procedure (e.g., a LBT gap aware sensing/re-evaluation procedure) to determine whether a total value of the CPE and the gap is longer than one OFDM symbol. For example, as illustrated in FIG. 15, a LBT gap associated with a subchannel at s-th slot may impact an availability of any subchannel at (s−1)-th slot when a receiver UE is within a LBT range of a transmitter UE, and to-be-transmitted TB(s) of the receiver UE have a lower priority than that of a reservation.

In certain aspects, when the CPE and the gap is longer the one OFDM symbol, the receiver UE is not able to transmit a full length PSSCH transmission using the future sidelink resource at the (s−1)-th slot. Furthermore, even when the CPE and the gap is within the one OFDM symbol, the receiver UE is prevented from continuous transmissions from the (s−1)-th slot to the s-th slot (e.g., leaving the gap symbol for a CCA).

In certain aspects, the LBT gap aware sensing procedure may be optimized with two options. In one option, a medium access control (MAC) indicates a physical layer (PHY) to exclude a set of subchannels overlapped with relevant LBT gap(s) (e.g., two UEs are within the LBT range) from a candidate set in a receiver UE sensing report. In another option, the PHY reports to the MAC a set of candidate resource set as per legacy, together with identified reservations of the LBT gap, and the MAC performs the LBT gap aware resource selection.

In certain aspects, the transmitter UE receives (e.g., from the receiver UE) a shortened PSSCH over the future sidelink resource partially overlapping with the gap. For example, in heavy loading scenarios, the receiver UE determines to transmit the shorten PSSCH over the subchannel that is partially overlapping with the LBT gap reserved by a higher priority UE (e.g., the receiver UE and the transmitter UE are within the LBT/energy detection (ED) range).

Figure 16:
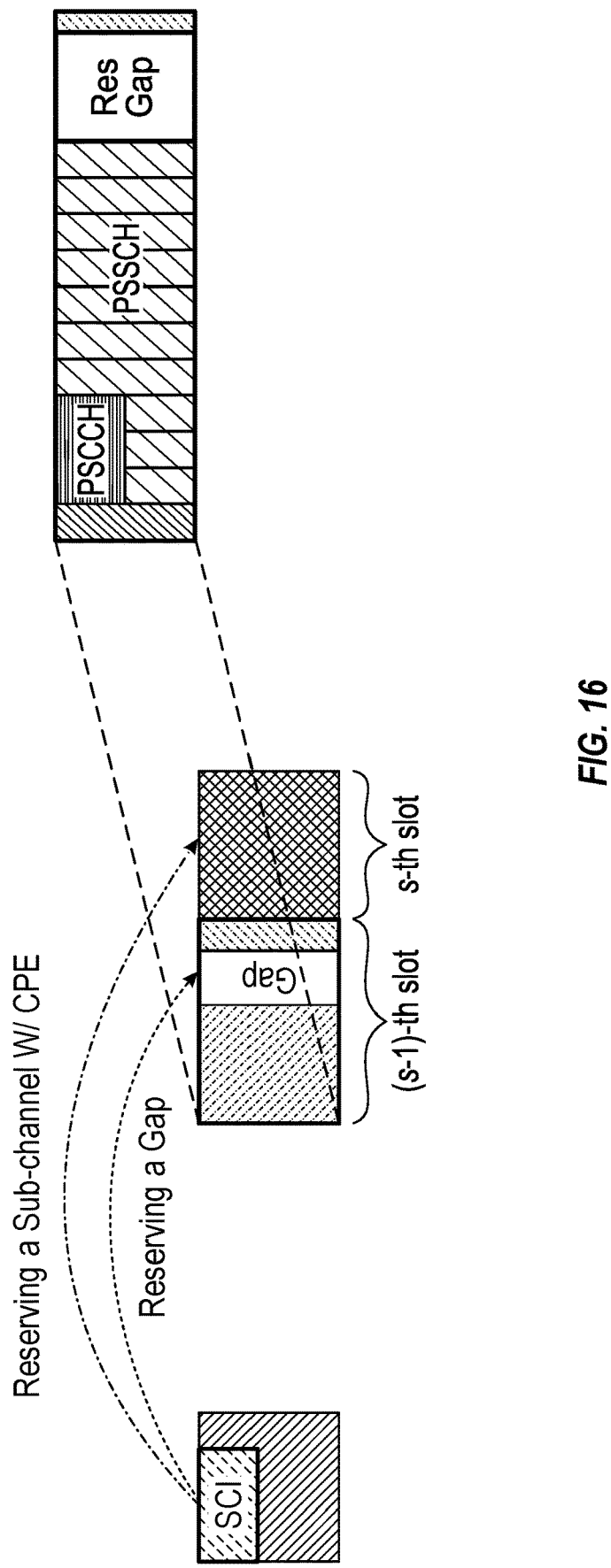
FIG. 16 depicts example CPE and gap aware puncturing.

In certain aspects, the transmitter UE punctures one or more data OFDM symbols of the future sidelink resource to leave the gap for the transmitter UE having a priority more than a threshold. For example, as illustrated in FIG. 16, last two data OFDM symbols at (s−1)-th slot are overlapping with a reserved LBT gap. In this case, the transmitter UE may puncture the last two data symbols to leave the LBT gap for a higher priority reservation. The transmitter UE may also include a flexible time domain resource allocation (TDRA) start and a length indicator value (SLIV) in the SCI to indicate the intended receiver(s).

In certain aspects, the SCI further indicates the puncturing in a current slot or in a previous sidelink transmission. For example, when the transmitter UE may puncture the last two data symbols, the transmitter UE can carry a codepoint in the SCI indicating puncturing in a current slot (e.g., when allowed by the transmitter UE processing time) or in a previous transmission (e.g., when there was not enough processing time to prepare the SCI in the previous transmission).

In certain aspects, the transmitter UE receives (e.g., from the receiver UE) a shortened PSSCH over a slot to support a LBT procedure by the transmitter UE. For example, the transmitter UE determines to transmit the shortened PSSCH (e.g., either floating SLIV or puncturing) over the (s−1)-th slot to help the LBT attempt of the transmitter UE (i.e., reservation owner).

In some cases, a RAT performing synchronous channel access (e.g., like sidelink unlicensed) can be starved by a more capable one performing asynchronous channel access (e.g., like Wi-Fi). In some cases, to suppress possibility of starving, SL-U UEs can arrange UE coordination (e.g., via PC5-radio resource control (RRC)) to help each other in the LBT procedure. For example, the receiver UE and the transmitter UE may agree to create a LBT helping group. When the transmitter UE needs the LBT gap (e.g., of 34 us) and sends this message out via the LBT gap in the SCI, the receiver UE may create a slightly larger gap (e.g., 40 us) by transmitting at (s−1)-th slot a properly shortened PSSCH. This may help in gating out near-by asynchronous LBT attempts requiring lager eCCA intervals.

In certain aspects, the transmitter UE receives (e.g., from a network entity) an indication indicating only partial OFDM symbols are available for the future sidelink resource. For example, the transmitter UE may receive a downlink control information (DCI) from a gNodeB (gNB) indicating that only partial OFDM symbols are available for the sub-channel at (s−1)-th slot. Upon receiving such grant, a Mode 1 transmitter UE may perform either floating SLIV or puncturing, and carry such indication in the SCI.

Example Operations of a Transmitter UE

FIG. 17 illustrates example operations 1700 for wireless communication. The operations 1700 may be performed, for example, by a transmitter user equipment (UE) (e.g., such as UE 104 in wireless communication network 100 of FIG. 1). The operations 1700 may be implemented as software components that are executed and run on one or more processors (e.g., controller/processor 380 of FIG. 3). Further, transmission and reception of signals by the transmitter UE in the operations 1700 may be enabled, for example, by one or more antennas (e.g., antennas 352 of FIG. 3). In certain aspects, the transmission and/or reception of signals by the transmitter UE may be implemented via a bus interface of one or more processors (e.g., the controller/processor 380) obtaining and/or outputting signals.

The operations 1700 begin, at 1710, by transmitting, to a receiver UE, sidelink control information (SCI) to reserve a future sidelink resource for a sidelink transmission to the receiver UE. The SCI indicates transmission of the sidelink transmission will begin with a cyclic prefix (CP) extension (CPE). For example, the transmitter UE may transmit the SCI, using antenna(s) and/or transmitter/transceiver components of UE 104 shown in FIG. 1 or FIG. 3 and/or of the apparatus shown in FIG. 19.

At 1720, the transmitter UE transmits, to the receiver UE, the sidelink transmission with the CPE on the future sidelink resource in accordance with the SCI. For example, the transmitter UE may transmit the sidelink transmission with the CPE, using antenna(s) and/or transmitter/transceiver components of UE 104 shown in FIG. 1 or FIG. 3 and/or of the apparatus shown in FIG. 19.

Note that FIG. 17 is just one example of a method, and other methods including fewer, additional, or alternative steps are possible consistent with this disclosure.

Example Operations of a Receiver UE

FIG. 18 illustrates example operations 1800 for wireless communication. The operations 1800 may be performed, for example, by a receiver user equipment (UE) (e.g., such as UE 104 in wireless communication network 100 of FIG. 1). The operations 1800 may be implemented as software components that are executed and run on one or more processors (e.g., controller/processor 380 of FIG. 3). Further, transmission and reception of signals by the receiver UE in the operations 1800 may be enabled, for example, by one or more antennas (e.g., antennas 352 of FIG. 3). In certain aspects, the transmission and/or reception of signals by the receiver UE may be implemented via a bus interface of one or more processors (e.g., the controller/processor 380) obtaining and/or outputting signals.

The operations 1800 begin, at 1810, by receiving, from a transmitter UE, sidelink control information (SCI) reserving a future sidelink resource for a sidelink transmission by the transmitter UE. The SCI indicates transmission of the sidelink transmission will begin with a cyclic prefix (CP) extension (CPE). For example, the receiver UE may receive the SCI, using antenna(s) and/or receiver/transceiver components of UE 104 shown in FIG. 1 or FIG. 3 and/or of the apparatus shown in FIG. 20.

At 1820, the receiver UE receives, from the transmitter UE, the sidelink transmission with the CPE on the future sidelink resource in accordance with the SCI. For example, the receiver UE may receive the sidelink transmission with the CPE, using antenna(s) and/or receiver/transceiver components of UE 104 shown in FIG. 1 or FIG. 3 and/or of the apparatus shown in FIG. 20.

Note that FIG. 18 is just one example of a method, and other methods including fewer, additional, or alternative steps are possible consistent with this disclosure.

Example Communications Devices

Figure 19:
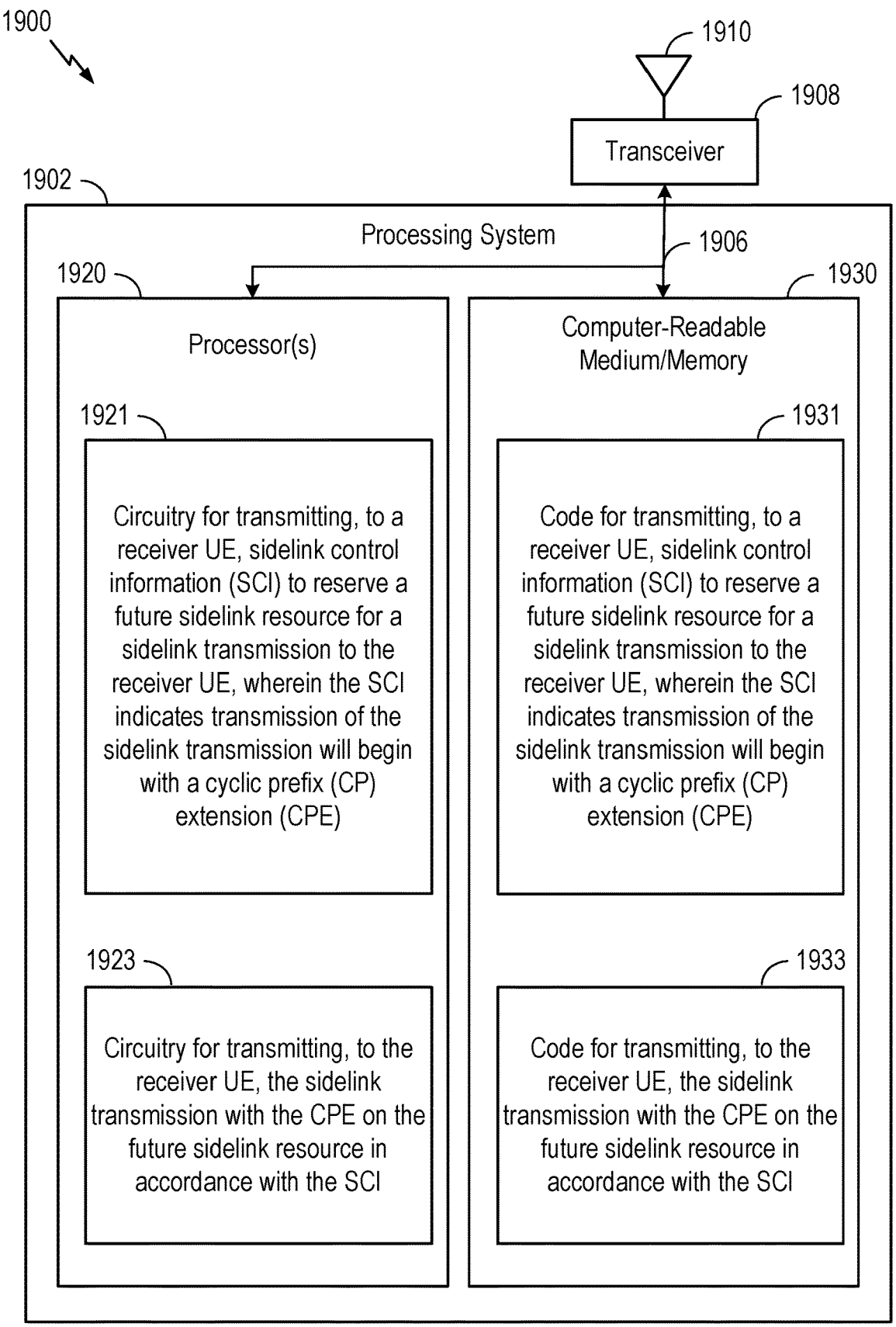
FIG. 19 depicts aspects of an example communications device.

FIG. 19 depicts aspects of an example communications device 1900. In some aspects, communications device 1900 is a transmitter user equipment (UE), such as UE 104 described above with respect to FIGS. 1 and 3.

The communications device 1900 includes a processing system 1902 coupled to a transceiver 1908 (e.g., a transmitter and/or a receiver). The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes one or more processors 1920. In various aspects, the one or more processors 1920 may be representative of one or more of receive processor 358, transmit processor 364, TX MIMO processor 366, and/or controller/processor 380, as described with respect to FIG. 3. The one or more processors 1920 are coupled to a computer-readable medium/memory 1930 via a bus 1906. In certain aspects, the computer-readable medium/memory 1930 is configured to store instructions (e.g., computer-executable code) that when executed by the one or more processors 1920, cause the one or more processors 1920 to perform the operations 1700 described with respect to FIG. 17, or any aspect related to it. Note that reference to a processor performing a function of communications device 1900 may include one or more processors performing that function of communications device 1900.

In the depicted example, computer-readable medium/memory 1930 stores code (e.g., executable instructions) for transmitting 1931 comprising code for transmitting, to a receiver UE, sidelink control information (SCI) to reserve a future sidelink resource for a sidelink transmission to the receiver UE where the SCI indicates transmission of the sidelink transmission will begin with a cyclic prefix (CP) extension (CPE), and code for transmitting 1933 comprising code for transmitting, to the receiver UE, the sidelink transmission with the CPE on the future sidelink resource in accordance with the SCI. Processing of the code 1931-1933 may cause the communications device 1900 to perform the operations 1700 described with respect to FIG. 17, or any aspect related to it.

The one or more processors 1920 include circuitry configured to implement (e.g., execute) the code stored in the computer-readable medium/memory 1930, including circuitry for transmitting 1921 comprising circuitry for transmitting, to a receiver UE, SCI to reserve a future sidelink resource for a sidelink transmission to the receiver UE where the SCI indicates transmission of the sidelink transmission will begin with a CPE, and circuitry for transmitting 1923 comprising circuitry for transmitting, to the receiver UE, the sidelink transmission with the CPE on the future sidelink resource in accordance with the SCI. Processing with circuitry 1921-1923 may cause the communications device 1900 to perform the operations 1700 described with respect to FIG. 17, or any aspect related to it.

Various components of the communications device 1900 may provide means for performing the operations 1700 described with respect to FIG. 17, or any aspect related to it. For example, means for transmitting, sending or outputting for transmission may include the transceivers 354 and/or antenna(s) 352 of the UE 104 illustrated in FIG. 3 and/or transceiver 1908 and antenna 1910 of the communications device 1900 in FIG. 19. Means for receiving or obtaining may include the transceivers 354 and/or antenna(s) 352 of the UE 104 illustrated in FIG. 3 and/or transceiver 1908 and antenna 1910 of the communications device 1900 in FIG. 19.

Figure 20:
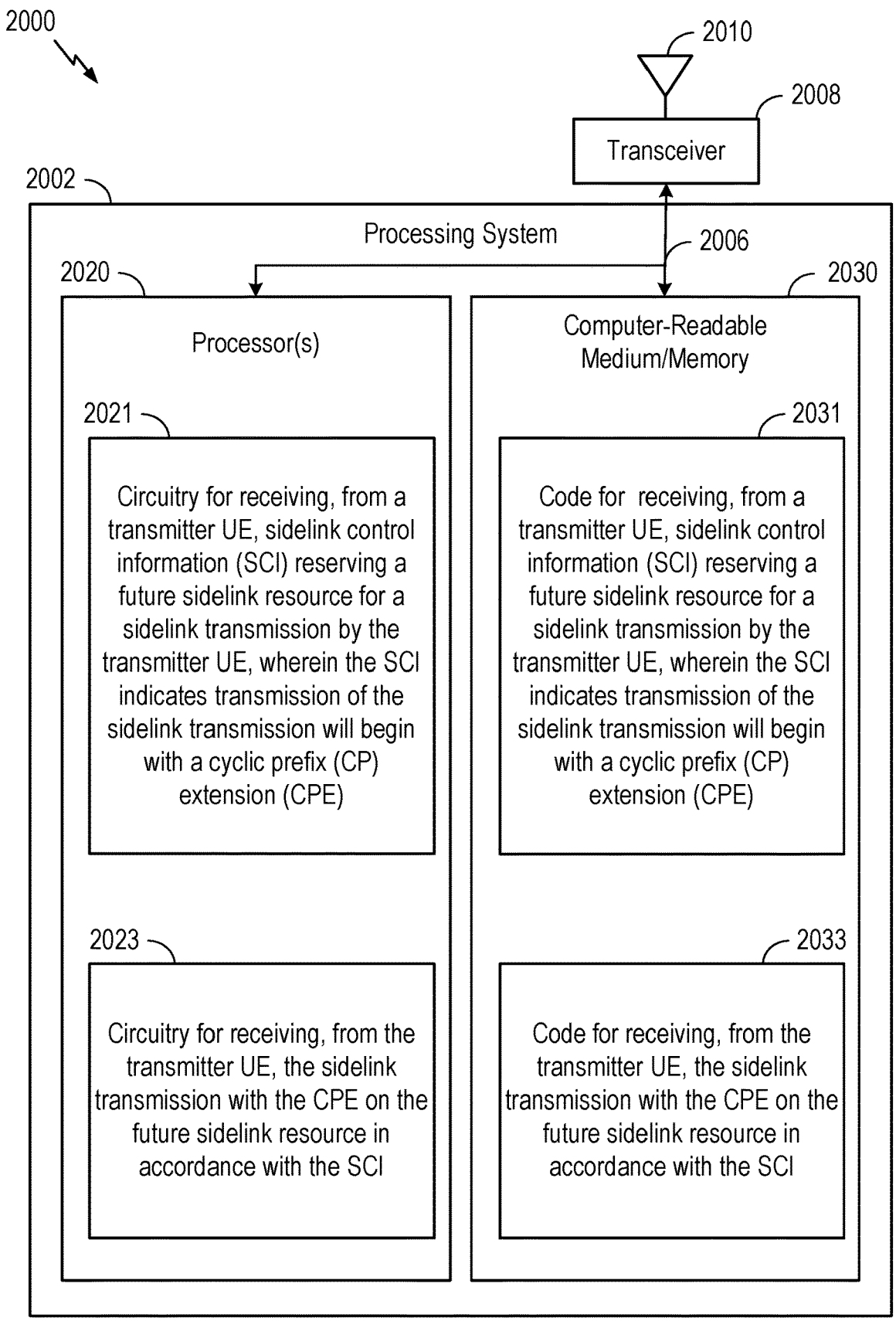
FIG. 20 depicts aspects of an example communications device.

FIG. 20 depicts aspects of an example communications device 2000. In some aspects, communications device 2000 is a receiver UE, such as UE 104 described above with respect to FIGS. 1 and 3.

The communications device 2000 includes a processing system 2002 coupled to a transceiver 2008 (e.g., a transmitter and/or a receiver). The transceiver 2008 is configured to transmit and receive signals for the communications device 2000 via an antenna 2010, such as the various signals as described herein. The processing system 2002 may be configured to perform processing functions for the communications device 2000, including processing signals received and/or to be transmitted by the communications device 2000.

The processing system 2002 includes one or more processors 2020. In various aspects, the one or more processors 2020 may be representative of one or more of receive processor 358, transmit processor 364, TX MIMO processor 366, and/or controller/processor 380, as described with respect to FIG. 3. The one or more processors 2020 are coupled to a computer-readable medium/memory 2030 via a bus 2006. In certain aspects, the computer-readable medium/memory 2030 is configured to store instructions (e.g., computer-executable code) that when executed by the one or more processors 2020, cause the one or more processors 2020 to perform the operations 1800 described with respect to FIG. 18, or any aspect related to it. Note that reference to a processor performing a function of communications device 2000 may include one or more processors performing that function of communications device 2000.

In the depicted example, computer-readable medium/memory 2030 stores code (e.g., executable instructions) for receiving 2031 comprising code for receiving, from a transmitter UE, SCI reserving a future sidelink resource for a sidelink transmission by the transmitter UE where the SCI indicates transmission of the sidelink transmission will begin with a CPE, and code for receiving 2033 comprising code for receiving, from the transmitter UE, the sidelink transmission with the CPE on the future sidelink resource in accordance with the SCI. Processing of the code 2031-2033 may cause the communications device 2000 to perform the operations 1800 described with respect to FIG. 18, or any aspect related to it.

The one or more processors 2020 include circuitry configured to implement (e.g., execute) the code stored in the computer-readable medium/memory 2030, including circuitry for receiving 2021 comprising circuitry for receiving, from a transmitter UE, SCI reserving a future sidelink resource for a sidelink transmission by the transmitter UE where the SCI indicates transmission of the sidelink transmission will begin with a CPE, and circuitry for receiving 2023 comprising circuitry for receiving, from the transmitter UE, the sidelink transmission with the CPE on the future sidelink resource in accordance with the SCI. Processing with circuitry 2021-2023 may cause the communications device 2000 to perform the operations 1800 described with respect to FIG. 18, or any aspect related to it.

Various components of the communications device 2000 may provide means for performing the operations 1800 described with respect to FIG. 18, or any aspect related to it. For example, means for transmitting, sending or outputting for transmission may include the transceivers 354 and/or antenna(s) 352 of the UE 104 illustrated in FIG. 3 and/or transceiver 2008 and antenna 2010 of the communications device 2000 in FIG. 20. Means for receiving or obtaining may include the transceivers 354 and/or antenna(s) 352 of the UE 104 illustrated in FIG. 3 and/or transceiver 2008 and antenna 2010 of the communications device 2000 in FIG. 20.

Example Clauses

Implementation examples are described in the following numbered clauses:

Clause 1: A method for wireless communications by a transmitter user equipment (UE), comprising: transmitting, to a receiver UE, sidelink control information (SCI) to reserve a future sidelink resource for a sidelink transmission to the receiver UE, wherein the SCI indicates transmission of the sidelink transmission will begin with a cyclic prefix (CP) extension (CPE); and transmitting, to the receiver UE, the sidelink transmission with the CPE on the future sidelink resource in accordance with the SCI.

Clause 2: The method alone or in combination with the first clause, wherein the future sidelink resource comprises frequency resources within an unlicensed spectrum.

Clause 3: The method alone or in combination with the first clause, further comprising generating the CPE from a first orthogonal frequency-division multiplexing (OFDM) symbol of the sidelink transmission.

Clause 4: The method alone or in combination with the first clause, further comprising determining a duration of the CPE based on at least one of: a subcarrier spacing (SCS) or a timing advance (TA) value for the transmitter UE.

Clause 5: The method alone or in combination with the first clause, further comprising: performing a listen-before-talk (LBT) procedure; and transmitting the sidelink transmission after the LBT procedure is performed.

Clause 6: The method alone or in combination with the first clause, further comprising randomly selecting a duration of the CPE within an allowed range.

Clause 7: The method alone or in combination with the first clause, further comprising selecting a duration of the CPE based on a mapping of one or more variables comprising at least one of a priority value, a packet delay budget value, or a channel busy ratio (CBR).

Clause 8: The method alone or in combination with the first clause, wherein the SCI explicitly indicates at least one value of the CPE.

Clause 9: The method alone or in combination with the first and eighth clauses, wherein the SCI further indicates different values of the CPE and multiple starting points for the sidelink transmission based on the different values of the CPE.

Clause 10: The method alone or in combination with the first clause, wherein: the SCI carries a channel access priority class (CAPC) mapped to different values for the CPE, and the method further comprising randomly selecting one value within the different values for the CPE.

Clause 11: The method alone or in combination with the first and tenth clauses, wherein the SCI further indicates multiple starting points for the sidelink transmission based on the different values of the CPE within an allowed range.

Clause 12: The method alone or in combination with the first clause, wherein the SCI indicates the transmission of the sidelink transmission will begin with a non-zero CPE.

Clause 13: The method alone or in combination with the first clause, wherein the SCI indicates the transmission of the sidelink transmission will begin with the CPE when at least one of: the transmitter UE occupies a number of interlaces more than an interlace threshold for transmitting one or more transport blocks (TBs), the one or more TBs to be transmitted to the receiver UE have a priority more than a priority threshold, the one or more TBs to be transmitted to the receiver UE have a packet delay budget (PDB) more than a PDB threshold, or a value of a constant-bit-rate (CBR) is more than a CBR threshold.

Clause 14: The method alone or in combination with the first clause, wherein the SCI further indicates a gap for a listen-before-talk (LBT) procedure before the CPE.

Clause 15: The method alone or in combination with the first and fourteenth clauses, wherein the SCI explicitly indicates a value of the gap.

Clause 16: The method alone or in combination with the first and fourteenth clauses, wherein: the SCI carries a channel access priority class (CAPC), and a value of the gap is implicitly indicated to the receiver UE via the CAPC.

Clause 17: The method alone or in combination with the first and fourteenth clauses, further comprising receiving, from the receiver UE, over the future sidelink resource, a shortened physical sidelink shared channel (PSSCH) that partially overlaps with the gap.

Clause 18: The method alone or in combination with the first and fourteenth clauses, further comprising puncturing one or more data orthogonal frequency-division multiplexing (OFDM) symbols of the future sidelink resource to leave the gap for the transmitter UE having a priority more than a threshold.

Clause 19: The method alone or in combination with the eighteenth clause, wherein the SCI further indicates the puncturing in a current slot or in a previous sidelink transmission.

Clause 20: The method alone or in combination with the eighteenth clause, further comprising receiving, from the receiver UE, a shortened physical sidelink shared channel (PSSCH) over a slot to support a listen-before-talk (LBT) procedure by the transmitter UE.

Clause 21: The method alone or in combination with the first clause, further comprising receiving, from a network entity, downlink control information (DCI) indicating only partial orthogonal frequency-division multiplexing (OFDM) symbols are available for the future sidelink resource.

Clause 22: A method for wireless communications by a receiver user equipment (UE), comprising: receiving, from a transmitter UE, sidelink control information (SCI) reserving a future sidelink resource for a sidelink transmission by the transmitter UE, wherein the SCI indicates transmission of the sidelink transmission will begin with a cyclic prefix (CP) extension (CPE); and receiving, from the transmitter UE, the sidelink transmission with the CPE on the future sidelink resource in accordance with the SCI.

Clause 23: The method alone or in combination with the twenty-second clause, further comprising transmitting a transport block (TB) using the future sidelink resource with a first CPE having a value greater than the CPE, when the TB has a priority more than a predetermined threshold.

Clause 24: The method alone or in combination with the twenty-second clause, further comprising transmitting a transport block (TB) using the future sidelink resource with the same CPE, when the TB has a priority less than a predetermined threshold and there are sidelink resources available in a same resource block (RB) set.

Clause 25: The method alone or in combination with the twenty-second clause, further comprising transmitting a transport block (TB) using the future sidelink resource with a second CPE having a value smaller than the CPE, when the TB has a priority less than a predetermined threshold and there are no sidelink resources available.

Clause 26: The method alone or in combination with the twenty-second clause, wherein the SCI further indicates different values of the CPE and multiple starting points for the sidelink transmission via the different values of the CPE.

Clause 27: The method alone or in combination with the twenty-sixth clause, further comprising: transmitting a transport block (TB) using the future sidelink resource with a third CPE having a value greater than the different values of the CPE, when the TB has a priority more than a predetermined threshold; or transmitting the TB using the future sidelink resource with a fourth CPE having a value smaller than the different values of the CPE, when the TB has the priority less than the predetermined threshold.

Clause 28: The method alone or in combination with the twenty-second clause, wherein: the SCI further indicates a gap for a listen-before-talk (LBT) procedure before the CPE, and the method further comprising performing a LBT gap aware sensing procedure to determine whether a total value of the CPE and the gap is longer than one orthogonal frequency-division multiplexing (OFDM) symbol, wherein the receiver UE is not able to transmit a full length physical sidelink shared channel (PSSCH) transmission using the future sidelink resource when the total value of the CPE and the gap is within the one OFDM symbol.

Clause 29: An apparatus, comprising: a memory comprising executable instructions; and a processor configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by a processor of an apparatus, cause the apparatus to perform a method in accordance with any one of Clauses 1-28.

Clause 32: A computer program product embodied on a computer-readable storage medium comprising code for performing a method in accordance with any one of Clauses 1-28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications at a transmitter user equipment (UE), comprising:
   one or more memories comprising instructions; and
   one or more processors configured to execute the instructions and cause the transmitter UE to:
      transmit, to a receiver UE, sidelink control information (SCI) to reserve a slot for a sidelink transmission to the receiver UE, wherein the SCI indicates transmission of the sidelink transmission will begin with a cyclic prefix (CP) extension (CPE) ahead of a slot boundary of the slot; and
      transmit, to the receiver UE, the sidelink transmission with the CPE on the slot in accordance with the SCI.

2. The apparatus of claim 1, wherein the slot comprises frequency resources within an unlicensed spectrum.

3. The apparatus of claim 1, wherein the one or more processors are further configured to execute the instructions and cause the transmitter UE to generate the CPE from a first orthogonal frequency-division multiplexing (OFDM) symbol of the sidelink transmission.

4. The apparatus of claim 1, wherein the one or more processors are further configured to execute the instructions and cause the transmitter UE to determine a duration of the CPE based on at least one of: a subcarrier spacing (SCS) or a timing advance (TA) value for the transmitter UE.

5. The apparatus of claim 1, wherein the one or more processors are further configured to execute the instructions and cause the transmitter UE to:
   perform a listen-before-talk (LBT) procedure; and
   transmit the sidelink transmission after the LBT procedure is performed.

6. The apparatus of claim 1, wherein the one or more processors are further configured to execute the instructions and cause the transmitter UE to randomly select a duration of the CPE within an allowed range.

7. The apparatus of claim 1, wherein the one or more processors are further configured to execute the instructions and cause the transmitter UE to select a duration of the CPE based on a mapping of one or more variables comprising at least one of a priority value, a packet delay budget value, or a channel busy ratio (CBR).

8. The apparatus of claim 1, wherein the SCI explicitly indicates at least one value of the CPE.

9. The apparatus of claim 8, wherein the SCI further indicates different values of the CPE and multiple starting points for the sidelink transmission based on the different values of the CPE.

10. The apparatus of claim 1, wherein:
    the SCI carries a channel access priority class (CAPC) mapped to different values for the CPE, and
    the one or more processors are further configured to execute the instructions and cause the transmitter UE to randomly select one value within the different values for the CPE.

11. The apparatus of claim 10, wherein the SCI further indicates multiple starting points for the sidelink transmission based on the different values of the CPE within an allowed range.

12. The apparatus of claim 1, wherein the SCI indicates the transmission of the sidelink transmission will begin with a non-zero CPE.

13. The apparatus of claim 1, wherein the SCI indicates the transmission of the sidelink transmission will begin with the CPE when at least one of:
    the transmitter UE occupies a number of interlaces more than an interlace threshold for transmitting one or more transport blocks (TBs),
    the one or more TBs to be transmitted to the receiver UE have a priority more than a priority threshold,
    the one or more TBs to be transmitted to the receiver UE have a packet delay budget (PDB) more than a PDB threshold, or
    a value of a constant-bit-rate (CBR) is more than a CBR threshold.

14. The apparatus of claim 1, wherein the SCI further indicates a gap for a listen-before-talk (LBT) procedure before the CPE.

15. The apparatus of claim 14, wherein the SCI explicitly indicates a value of the gap.

16. The apparatus of claim 14, wherein:
    the SCI carries a channel access priority class (CAPC), and
    a value of the gap is implicitly indicated to the receiver UE via the CAPC.

17. The apparatus of claim 14, wherein the one or more processors are further configured to execute the instructions and cause the transmitter UE to receive, from the receiver UE, over the slot, a shortened physical sidelink shared channel (PSSCH) that partially overlaps with the gap.

18. The apparatus of claim 14, wherein the one or more processors are further configured to execute the instructions and cause the transmitter UE to puncture one or more data orthogonal frequency-division multiplexing (OFDM) symbols of the slot to leave the gap for the transmitter UE having a priority more than a threshold.

19. The apparatus of claim 18, wherein the SCI further indicates the puncturing in a current slot or in a previous sidelink transmission.

20. The apparatus of claim 18, wherein the one or more processors are further configured to execute the instructions and cause the transmitter UE to receive, from the receiver UE, a shortened physical sidelink shared channel (PSSCH) over a slot to support a listen-before-talk (LBT) procedure by the transmitter UE.

21. The apparatus of claim 1, wherein the one or more processors are further configured to execute the instructions and cause the transmitter UE to receive, from a network entity, downlink control information (DCI) indicating only partial orthogonal frequency-division multiplexing (OFDM) symbols are available for the slot.

22. An apparatus for wireless communications at a receiver user equipment (UE), comprising:
one or more memories comprising instructions; and
one or more processors configured to execute the instructions and cause the receiver UE to:
receive, from a transmitter UE, sidelink control information (SCI) reserving a slot for a sidelink transmission by the transmitter UE, wherein the SCI indicates transmission of the sidelink transmission will begin with a cyclic prefix (CP) extension (CPE) ahead of a slot boundary of the slot; and
receive, from the transmitter UE, the sidelink transmission with the CPE on the slot in accordance with the SCI.

23. The apparatus of claim 22, wherein the one or more processors are further configured to execute the instructions and cause the receiver UE to transmit a transport block (TB) using the slot resource with a first CPE having a value greater than the CPE, when the TB has a priority more than a predetermined threshold.

24. The apparatus of claim 22, wherein the one or more processors are further configured to execute the instructions and cause the receiver UE to transmit a transport block (TB) using the slot with the same CPE, when the TB has a priority less than a predetermined threshold and there are sidelink resources available in a same resource block (RB) set.

25. The apparatus of claim 22, wherein the one or more processors are further configured to execute the instructions and cause the receiver UE to transmit a transport block (TB) using the slot with a second CPE having a value smaller than the CPE, when the TB has a priority less than a predetermined threshold and there are no sidelink resources available.

26. The apparatus of claim 22, wherein the SCI further indicates different values of the CPE and multiple starting points for the sidelink transmission via the different values of the CPE.

27. The apparatus of claim 26, wherein the one or more processors are further configured to execute the instructions and cause the receiver UE to:
transmit a transport block (TB) using the slot with a third CPE having a value greater than the different values of the CPE, when the TB has a priority more than a predetermined threshold; or
transmit the TB using the slot with a fourth CPE having a value smaller than the different values of the CPE, when the TB has the priority less than the predetermined threshold.

28. The apparatus of claim 22, wherein:
the SCI further indicates a gap for a listen-before-talk (LBT) procedure before the CPE, and
the one or more processors are further configured to execute the instructions and cause the receiver UE to perform a LBT gap aware sensing procedure to determine whether a total value of the CPE and the gap is longer than one orthogonal frequency-division multiplexing (OFDM) symbol, wherein the receiver UE is not able to transmit a full length physical sidelink shared channel (PSSCH) transmission using the slot when the total value of the CPE and the gap is within the one OFDM symbol.

29. A method for wireless communications at a transmitter user equipment (UE), comprising:
transmitting, to a receiver UE, sidelink control information (SCI) to reserve a slot for a sidelink transmission to the receiver UE, wherein the SCI indicates transmission of the sidelink transmission will begin with a cyclic prefix (CP) extension (CPE) ahead of a slot boundary of the slot; and
transmitting, to the receiver UE, the sidelink transmission with the CPE on the slot in accordance with the SCI.

30. A method for wireless communications at a receiver user equipment (UE), comprising:
receiving, from a transmitter UE, sidelink control information (SCI) reserving a slot for a sidelink transmission by the transmitter UE, wherein the SCI indicates transmission of the sidelink transmission will begin with a cyclic prefix (CP) extension (CPE) ahead of a slot boundary of the slot; and
receiving, from the transmitter UE, the sidelink transmission with the CPE on the slot in accordance with the SCI.

* * * * *